(12) United States Patent
Saha

(10) Patent No.: US 12,249,937 B2
(45) Date of Patent: Mar. 11, 2025

(54) ROTATING ELECTRICAL MACHINE CONTROL SYSTEM

(71) Applicant: AISIN CORPORATION, Aichi (JP)

(72) Inventor: Subrata Saha, Kariya (JP)

(73) Assignee: AISIN CORPORATION, Kariya (JP)

( * ) Notice: Subject to any disclaimer, the term of this patent is extended or adjusted under 35 U.S.C. 154(b) by 45 days.

(21) Appl. No.: 18/030,921

(22) PCT Filed: Feb. 2, 2022

(86) PCT No.: PCT/JP2022/004060
§ 371 (c)(1),
(2) Date: Apr. 7, 2023

(87) PCT Pub. No.: WO2022/168869
PCT Pub. Date: Aug. 11, 2022

(65) Prior Publication Data
US 2023/0378896 A1   Nov. 23, 2023

(30) Foreign Application Priority Data
Feb. 5, 2021  (JP) .................................. 2021-017730

(51) Int. Cl.
*H02P 27/06* (2006.01)
*H02P 23/00* (2016.01)

(52) U.S. Cl.
CPC ............. *H02P 27/06* (2013.01); *H02P 23/00* (2013.01)

(58) Field of Classification Search
CPC .. H02P 27/06; H02P 23/00; H02P 3/22; H02P 29/024; H02P 29/025; B60L 2240/421; B60L 2240/423; B60L 2240/526; B60L 3/003; B60L 3/0092; B60L 15/007; H02M 1/32; H02M 7/521; H02M 7/527
USPC .................................................. 318/504, 494
See application file for complete search history.

(56) References Cited

U.S. PATENT DOCUMENTS
9,960,724 B2 *  5/2018  Kim .......................... H02P 3/14

FOREIGN PATENT DOCUMENTS
JP    2014-192950 A   10/2014

\* cited by examiner

*Primary Examiner* — David Luo
(74) *Attorney, Agent, or Firm* — Oliff PLC

(57) ABSTRACT

A control part determines that a contactor is in an open state, based on a voltage at both ends of a smoothing capacitor and a current flowing through a direct-current power supply. In a state in which rotational speed is greater than or equal to a speed threshold value, the control part controls both inverters by shutdown control and brings both contactors into an open state. After the rotational speed reaches less than the speed threshold value, the control part controls a failure-side inverter by active short-circuit control, and drives a normal-side inverter using discharge torque of a smoothing capacitor. After eliminating an abnormal voltage state, the control part controls a normal contactor to a closed state and drives a rotating electrical machine by one of the inverters.

8 Claims, 13 Drawing Sheets

ROTATING ELECTRICAL MACHINE CONTROL SYSTEM

TECHNICAL FIELD

The present disclosure relates to a rotating electrical machine control system that controls, through two inverters, drive of a rotating electrical machine having open-end windings.

BACKGROUND ART

There is known a rotating electrical machine control system that controls drive of a rotating electrical machine of a three-phase alternating-current type by performing switching control on inverters each provided at each end side of three-phase open-end windings included in the rotating electrical machine. JP 2014-192950 A discloses an example of such a rotating electrical machine control system. A smoothing capacitor for smoothing direct-current voltage is connected to a direct-current side of each inverter. In addition, different direct-current power supplies are connected to the respective inverters. This literature discloses a technique in which even if a failure has occurred in a switching element in such an inverter that drives the three-phase open-end windings, drive of the rotating electrical machine can be continued. According to the literature, when a failure has occurred in a switching element in either one of the two inverters, all upper-stage-side switching elements or all lower-stage-side switching elements in an inverter including the failed switching element are all brought into on state and all switching elements in the other inverter are brought into off state so that the inverter serves as a neutral point, by which the rotating electrical machine is driven by the other inverter having no failure.

CITATIONS LIST

Patent Literature

Patent Literature 1: JP 2014-192950 A

SUMMARY OF DISCLOSURE

Technical Problems

A location where a failure occurs in such a rotating electrical machine control system is not limited to a switching element in an inverter. For example, there is a case in which in the rotating electrical machine control system, a contactor such as a relay for establishing and cutting off an electrical connection between a direct-current power supply connected to each inverter, and the inverter and a smoothing capacitor is provided between the direct-current power supply, and the inverter and the smoothing capacitor. If the contactor goes into a state of cutting off an electrical connection due to a failure, etc., with the rotating electrical machine rotating, then supply of electric power from the direct-current power supply to the inverter may be interrupted, or a terminal-to-terminal voltage of the smoothing capacitor may rise because back electromotive force of the rotating electrical machine cannot be regenerated to the direct-current power supply. However, the above-described literature does not mention handling of a failure of the contactor.

In view of the above description, it is desired to provide a technique in which when a failure has occurred in one of contactors each provided between one of direct-current power supplies connected to respective two inverters each provided at each end side of open-end windings, the failed contactor is identified and drive of a rotating electrical machine is controlled.

Solutions to Problems

A rotating electrical machine control system that considers the above description and that controls drive of a rotating electrical machine having open-end windings of a plurality of phases that are independent of each other includes: a first inverter connected to a one-end side of the open-end windings; a second inverter connected to an other-end side of the open-end windings; a first direct-current power supply to which the first inverter is connected; a second direct-current power supply to which the second inverter is connected; a first smoothing capacitor connected in parallel to the first direct-current power supply; a second smoothing capacitor connected in parallel to the second direct-current power supply; a first contactor that establishes and cuts off an electrical connection between the first inverter and the first smoothing capacitor, and the first direct-current power supply; a second contactor that establishes and cuts off an electrical connection between the second inverter and the second smoothing capacitor, and the second direct-current power supply; and a control part that controls each of the first contactor and the second contactor and can control the first inverter and the second inverter independently of each other, and in the first inverter and the second inverter, an arm for one alternating-current phase includes a series circuit of an upper-stage-side switching element and a lower-stage-side switching element, the control part can control each of the first inverter and the second inverter by active short-circuit control that brings all of the upper-stage-side switching elements into off state and brings all of the lower-stage-side switching elements into on state, or brings all of the upper-stage-side switching elements into on state and brings all of the lower-stage-side switching elements into off state, and by shutdown control that brings all switching elements of a plurality of phases into off state, and using a first upper limit voltage set to a value larger than a voltage fluctuation range of the first direct-current power supply, a first lower limit voltage set to a value smaller than a voltage fluctuation range of the first direct-current power supply, a second upper limit voltage set to a value larger than a voltage fluctuation range of the second direct-current power supply, and a second lower limit voltage set to a value smaller than a voltage fluctuation range of the second direct-current power supply, the control part determines that the first contactor is in an open state, when a voltage at both ends of the first smoothing capacitor is higher than the first upper limit voltage or lower than the first lower limit voltage, and a current flowing through the first direct-current power supply is less than or equal to a first lower limit current defined in advance; determines that the second contactor is in an open state, when a voltage at both ends of the second smoothing capacitor is higher than the second upper limit voltage or lower than the second lower limit voltage, and a current flowing through the second direct-current power supply is less than or equal to a second lower limit current defined in advance; considers one of contactors that is determined to be in an open state a failed contactor and considers an other one of the contactors a normal contactor, the contactors being the first contactor and the second contactor; controls both the first inverter and the second inverter by shutdown control and brings both the first contactor and the second contactor into an open state, in a state in which a rotational speed of the rotating electrical machine is greater than or equal to a speed threshold value defined in advance; after a rotational speed of the rotating electrical machine reaches less than the speed threshold value, controls a failure-side inverter by the active short-circuit control and maintains the normal contactor in an open state, and drives a normal-side inverter using discharge torque of a normal-side smoothing capacitor, the failure-side inverter being an inverter connected to the failed contactor, the normal-side inverter being an inverter connected to the normal contactor, and the normal-side smoothing capacitor being a smoothing capacitor connected to the normal-side inverter; and after a rise in a voltage at both ends of the normal-side smoothing capacitor is eliminated, controls the normal contactor to a closed state and controls drive of the rotating electrical machine by the normal-side inverter.

According to this configuration, when the rotating electrical machine is performing regenerative operation, occurrence of a failure in a contactor can be detected by a current of a direct-current power supply that stops flowing due to the contactor going into an open state and by a voltage at both ends of a smoothing capacitor that rises by a regenerative current. In addition, when the rotating electrical machine is performing powering operation, occurrence of a failure in a contactor can be detected by a current of a direct-current power supply that stops flowing due to the contactor going into an open state and by a voltage at both ends of a smoothing capacitor that drops due to being discharged to drive the rotating electrical machine. Furthermore, according to the configuration, after both inverters are controlled by shutdown control, one of the inverters to which a failed contactor is connected is short-circuited by active short-circuit control, and the rotating electrical machine is driven by the other inverter. At this time, when the rotational speed of the rotating electrical machine is greater than or equal to the speed threshold value, a contactor having no failure is also controlled to an open state. By this, back electromotive force from the rotating electrical machine is absorbed by the two smoothing capacitors, enabling suppression of a rise in a voltage at both ends of a smoothing capacitor connected to the failed contactor. In this case, a voltage at both ends of a normal-side smoothing capacitor connected to a normal-side inverter also rises, but the normal-side smoothing capacitor is discharged by driving the normal-side inverter using discharge torque. When the rise in the voltage at both ends of the normal-side smoothing capacitor is eliminated, drive of the rotating electrical machine is controlled by the normal-side inverter. As such, according to the configuration, when a failure has occurred in one of the contactors each provided between one of the direct-current power supplies connected to the respective two inverters each provided at each end side of the open-end windings, the failed contactor is identified and drive of the rotating electrical machine can be controlled.

Further features and advantages of the rotating electrical machine control system will become apparent from the following description of an illustrative and non-restrictive embodiment which will be described with reference to drawings.

DESCRIPTION OF EMBODIMENTS

Figure 1:
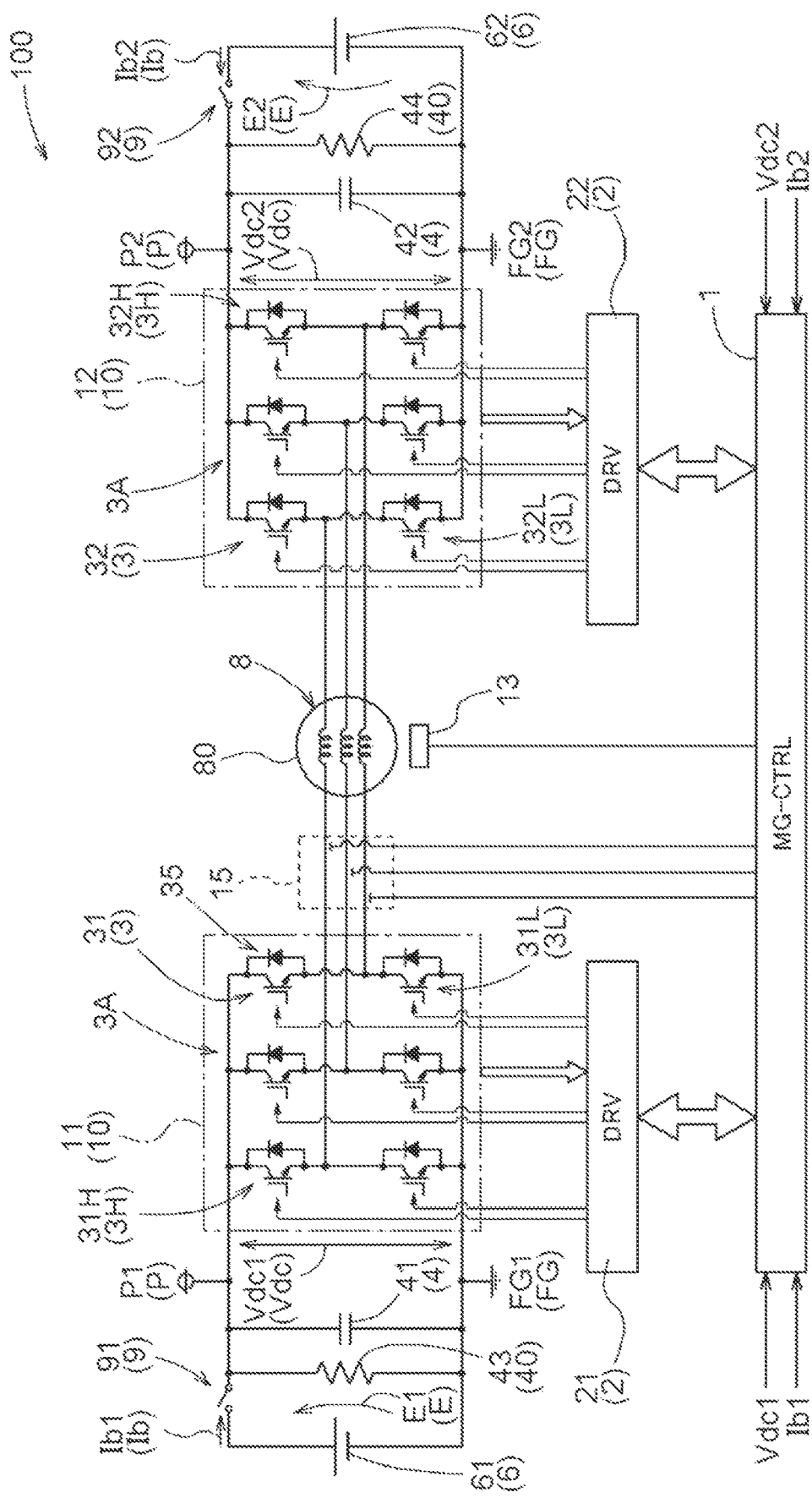
FIG. 1 is a schematic block diagram of a rotating electrical machine drive system.

An embodiment of a rotating electrical machine control device that controls, through two inverters, drive of a rotating electrical machine having open-end windings of a plurality of phases that are independent of each other will be described below based on the drawings. FIG. 1 is a schematic block diagram of a rotating electrical machine control system 100 including a rotating electrical machine control device 1 (MG-CTRL). A rotating electrical machine 80 serves as, for example, a drive power source for wheels of a vehicle such as an electric vehicle or a hybrid vehicle. The rotating electrical machine 80 is an open-end winding type rotating electrical machine having stator coils 8 (open-end windings) of a plurality of phases (three phases in the present embodiment) that are independent of each other. Inverters 10 that are controlled independently of each other to convert electric power between direct current and alternating currents of a plurality of phases (here, three phases) each are connected to each end side of the stator coils 8. That is, a first inverter 11 (INV1) is connected to a one-end side of the stator coils 8, and a second inverter 12 (INV2) is connected to an other-end side of the stator coils 8. In the following description, when the first inverter 11 and the second inverter 12 do not need to be distinguished from each other, the first inverter 11 and the second inverter 12 are simply referred to as the inverters 10.

The inverters 10 each are configured to include a plurality of switching elements 3. For the switching elements 3, insulated gate bipolar transistors (IGBTs) or power metal oxide semiconductor field effect transistors (MOSFETs) are used. FIG. 1 exemplifies a mode in which IGBTs are used as the switching elements 3. In the present embodiment, the first inverter 11 and the second inverter 12 are the inverters 10 of the same circuit configuration that use the same type of switching elements 3.

In the two inverters 10, each arm 3A for one alternating-current phase includes a series circuit of an upper-stage-side switching element 3H and a lower-stage-side switching element 3L. Each switching element 3 has a freewheeling diode 35 provided in parallel thereto, with a direction going from a negative polarity FG to a positive polarity P (a direction going from a lower-stage side to an upper-stage side) being a forward direction. Note that in the arms 3A of a plurality of phases, a side that includes the upper-stage-side switching elements 3H is referred to as upper-stage-side arms, and a side that includes the lower-stage-side switching elements 3L is referred to as lower-stage-side arms.

In addition, in the present embodiment, the two inverters 10 are connected to direct-current power supplies 6 that are independent of each other. That is, a first floating ground FG1 which is the negative polarity FG of the first inverter 11 and a second floating ground FG2 which is the negative polarity FG of the second inverter 12 are independent of each other. In addition, a direct-current link capacitor (smoothing capacitor 4) that smooths direct-current voltage is provided between each inverter 10 and a corresponding direct-current power supply 6. In addition, between the positive and negative polarities on the direct-current side of each inverter 10 there is provided a discharge resistor 40 in parallel to a smoothing capacitor 4.

Specifically, a first smoothing capacitor 41 is connected to a direct-current side of the first inverter 11 in which an arm 3A for one alternating-current phase includes a series circuit of a first upper-stage-side switching element 31H and a first lower-stage-side switching element 31L, and the first inverter 11 is connected on its direct-current side to a first direct-current power supply 61 and connected on its alternating-current side to the one-end side of the stator coils 8 of a plurality of phases, to convert electric power between direct current and alternating currents of a plurality of phases. A second smoothing capacitor 42 is connected to a direct-current side of the second inverter 12 in which an arm 3A for one alternating-current phase includes a series circuit of a second upper-stage-side switching element 32H and a second lower-stage-side switching element 32L, and the second inverter 12 is connected on its direct-current side to a second direct-current power supply 62 and connected on its alternating-current side to the other-end side of the stator coils 8 of a plurality of phases, to convert electric power between direct current and alternating currents of a plurality of phases.

In the present embodiment, the first direct-current power supply 61 and the second direct-current power supply 62 are direct-current power supplies having equal ratings of voltage, etc., and the first smoothing capacitor 41 and the second smoothing capacitor are capacitors having equal ratings of capacitance, etc. The rated voltage of the direct-current power supplies 6 is about 48 volts to 400 volts. The direct-current power supplies 6 include, for example, secondary batteries (batteries) such as nickel-hydrogen batteries or lithium-ion batteries, or electric energy storage devices such as electric double-layer capacitors. The rotating electrical machine 80 can function as both an electric motor and a generator. The rotating electrical machine 80 converts electric power from the direct-current power supplies 6 into mechanical power through the inverters 10 (powering). Alternatively, the rotating electrical machine 80 converts rotary drive power transmitted from the wheels, etc., into electric power to charge the direct-current power supplies 6 through the inverters 10 (regeneration).

As shown in FIG. 1, the inverters 10 are controlled by the rotating electrical machine control device 1 (control part). The rotating electrical machine control device 1 can control the first inverter 11 and the second inverter 12 using control schemes that are independent of each other (details of the control schemes will be described later). The rotating electrical machine control device 1 is constructed using a logic circuit such as a microcomputer, as a core member. For example, the rotating electrical machine control device 1 controls the rotating electrical machine 80 through the inverters 10 by performing current feedback control that uses a vector control method, based on target torque (torque instruction) of the rotating electrical machine 80 that is provided from other control devices, etc., such as a vehicle control device which is not shown.

Between the direct-current power supply 6, and the inverter 10 and the smoothing capacitor 4 there is provided a contactor 9 that establishes and cuts off an electrical connection therebetween. Specifically, a first contactor 91 is provided between the first inverter 11 and the first smoothing capacitor 41, and the first direct-current power supply 61, and a second contactor 92 is provided between the second inverter 12 and the second smoothing capacitor 42, and the second direct-current power supply 62. The contactor 9 is controlled by the above-described vehicle control device which is not shown or the rotating electrical machine control device 1 to electrically connect the direct-current power supply 6 to the inverter 10 and the smoothing capacitor 4 in a closed state (CLOSE) of the contactor 9, and to cut off the electrical connection therebetween in an open state (OPEN) of the contactor 9. The contactor 9 includes, for example, a relay.

An actual current flowing through a stator coil 8 of each phase of the rotating electrical machine 80 is detected by a current sensor 15, and a magnetic pole position at each time point of a rotor of the rotating electrical machine 80 is detected by a rotation sensor 13 such as a resolver. The rotating electrical machine control device 1 performs current feedback control using results of detection by the current sensor 15 and the rotation sensor 13. The rotating electrical machine control device 1 is configured to include various functional parts to perform current feedback control, and each functional part is implemented by cooperation of hardware such as a microcomputer and software (program). In addition, a direct-current link voltage Vdc which is a voltage on the direct-current side of each inverter 10 is detected by a voltage sensor which is not shown, and can be obtained by the rotating electrical machine control device 1. The rotating electrical machine control device 1 obtains a first direct-current link voltage Vdc1 which is a voltage on the direct-current side of the first inverter 11 and a second direct-current link voltage Vdc2 which is a voltage on the direct-current side of the second inverter 12.

Figure 2:
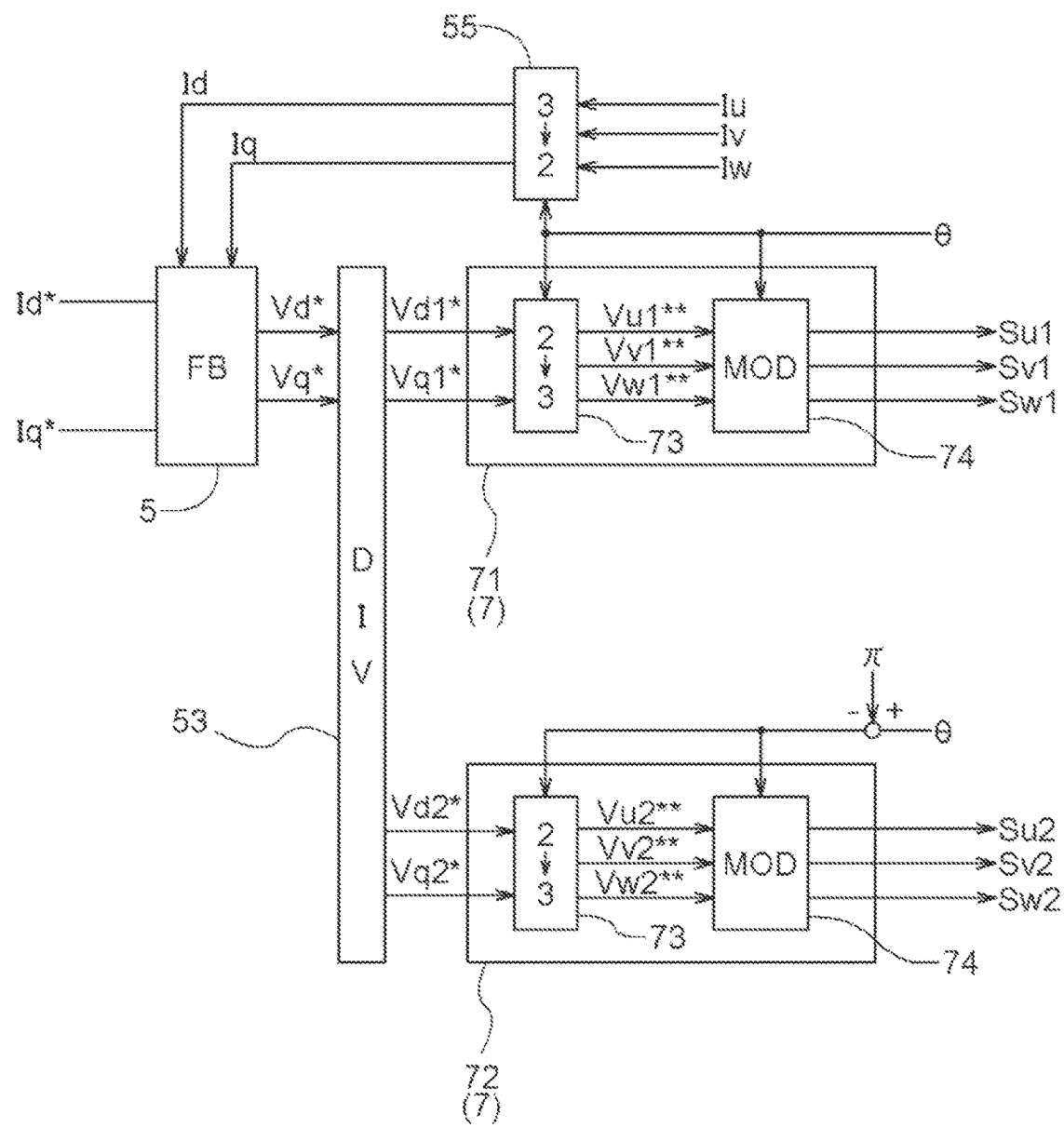
FIG. 2 is a simplified partial block diagram of a rotating electrical machine control device.

A block diagram of FIG. 2 shows some functional parts of the rotating electrical machine control device 1 in a simplified manner. In a vector control method, feedback control is performed by coordinate-transforming actual currents (a U-phase current Iu, a V-phase current Iv, and a W-phase current Iw) flowing through the rotating electrical machine 80 into vector components (a d-axis current Id and a q-axis current Iq) on a d-axis indicating a direction of a magnetic field (magnetic flux) generated by permanent magnets disposed in the rotor of the rotating electrical machine 80 and on a q-axis indicating a direction orthogonal to the d-axis (a direction advanced by an electrical angle of $\pi/2$ relative to the direction of the magnetic field). In the rotating electrical machine control device 1, a three-to-two phase coordinate-transforming part 55 performs coordinate transformation, based on a result of detection ($\theta$: a magnetic pole position and an electrical angle) by the rotation sensor 13.

A current feedback control part 5 (FB) performs feedback control on the rotating electrical machine 80 based on deviation between current instructions (a d-axis current instruction Id* and a q-axis current instruction Iq*) issued based on a torque instruction for the rotating electrical machine 80 and the actual currents (the d-axis current Id and the q-axis current Iq) in a d-q-axis orthogonal vector coordinate system, thereby computing voltage instructions (a d-axis voltage instruction Vd* and a q-axis voltage instruction Vq*). The rotating electrical machine 80 is driven through the two inverters 10, the first inverter 11 and the second inverter 12. Hence, the d-axis voltage instruction Vd* and the q-axis voltage instruction Vq* are divided, by a dividing part 53 (DIV), into a first d-axis voltage instruction Vd1* and a first q-axis voltage instruction Vq1* for the first inverter 11 and a second d-axis voltage instruction Vd2* and a second q-axis voltage instruction Vq2* for the second inverter 12.

As described above, the rotating electrical machine control device 1 can control the first inverter 11 and the second inverter 12 using control schemes that are independent of each other, and includes two voltage control parts 7 each including a three-phase voltage instruction computing part 73 and a modulating part 74 (MOD). Namely, the rotating electrical machine control device 1 includes a first voltage control part 71 that generates switching control signals (Su1, Sv1, and Sw1) for the respective U-phase, V-phase, and W-phase of the first inverter 11; and a second voltage control part 72 that generates switching control signals (Su2, Sv2, and Sw2) for the respective U-phase, V-phase, and W-phase of the second inverter 12. Though details will be described later, voltage instructions (Vu1, Vv1, and Vw1) for the first inverter 11 and voltage instructions (Vu2, Vv2, and Vw2) for the second inverter 12 differ from each other in phase by "$\pi$". Hence, a value obtained by subtracting "n" from a result of detection ($\theta$) by the rotation sensor 13 is inputted to the second voltage control part 72.

Note that as will be described later, modulation schemes include synchronous modulation that is synchronized with rotation of the rotating electrical machine 80; and asynchronous modulation that is independent of rotation of the rotating electrical machine 80. In general, a generation block (a generation flow in a case of software) for switching control signals by synchronous modulation differs from a generation block for switching control signals by asynchronous modulation. The above-described voltage control parts 7 generate switching control signals based on voltage instructions and a carrier that is not synchronized with rotation of the rotating electrical machine 80, but in the present embodiment, for simplification of description, description will be made assuming that switching control signals by synchronous modulation (e.g., switching control signals for a case of rectangular-wave control which will be described later) are also generated by the voltage control parts 7.

Note that as described above, each arm 3A of the inverters 10 includes a series circuit of an upper-stage-side switching element 3H and a lower-stage-side switching element 3L. Though not distinguished in FIG. 2, a switching control signal for each phase is outputted as two types of control signals, an upper-stage switching control signal and a lower-stage switching control signal. For example, a first U-phase switching control signal Su1 for performing switching control on the U-phase of the first inverter 11 is outputted as two signals, a first U-phase upper-stage-side switching control signal Su1+ which is added with "+" at the end and a first U-phase lower-stage-side switching control signal Su1− which is added with "−" at the end. Note that when an upper-stage-side switching element 3H and a lower-stage-side switching element 3L that are included in an arm 3A simultaneously go into on state, the arm 3A goes into a short-circuited state. To prevent this short circuit, there is provided dead time during which both an upper-stage-side switching control signal and a lower-stage-side switching control signal for each arm 3A go into an inactive state. The dead time is also added by the voltage control parts 7.

As shown in FIG. 1, a control terminal (a gate terminal in a case of an IGBT or a FET) of each switching element 3 included in the inverters 10 is connected to the rotating electrical machine control device 1 through a corresponding drive circuit 2 (DRV), and switching control is individually performed on the switching elements 3. High-voltage system circuits (systems connected to the direct-current power supplies 6) for driving the rotating electrical machine 80, such as the inverters 10, and low-voltage system circuits (systems with an operating voltage of about 3.3 volts to 5 volts) such as the rotating electrical machine control device 1 that uses a microcomputer, etc., as a core greatly differ from each other in operating voltage (the power supply voltage of the circuits). The drive circuits 2 increase each of drive capabilities (e.g., capabilities to allow a circuit at a subsequent stage to operate, such as voltage amplitude and output current) of a drive signal (switching control signal) for each switching element 3, and relay the drive signal. A first drive circuit 21 relays switching control signals to the first inverter 11, and a second drive circuit 22 relays switching control signals to the second inverter 12.

As switching pattern modes (modes of voltage waveform control) of the switching elements 3 included in the first inverter 11 and the second inverter 12, the rotating electrical machine control device 1 can perform, for example, two types of control, pulse width modulation (PWM) control in which a plurality of pulses with different patterns are outputted in one cycle of electrical angle, and rectangular-wave control (single-pulse control (1-Pulse)) in which one pulse is outputted in one cycle of electrical angle. Namely, the rotating electrical machine control device 1 can perform pulse width modulation control and rectangular-wave control as control schemes for the first inverter 11 and the second inverter 12. Note that as described above, the rotating electrical machine control device 1 can control the first inverter 11 and the second inverter 12 using control schemes that are independent of each other.

In addition, pulse width modulation has schemes such as continuous pulse width modulation (CPWM: continuous PWM), e.g., sinusoidal pulse width modulation (SPWM: sinusoidal PWM) and space vector pulse width modulation (SVPWM: space vector PWM), and discontinuous pulse width modulation (DPWM: discontinuous PWM). Thus, the pulse width modulation control that can be performed by the rotating electrical machine control device 1 includes, as control schemes, continuous pulse width modulation control and discontinuous pulse width modulation.

The continuous pulse width modulation is a modulation scheme in which pulse width modulation is continuously performed for all arms 3A of a plurality of phases, and the discontinuous pulse width modulation is a modulation scheme in which pulse width modulation is performed including a period during which switching elements in an arm(s) 3A of one or more of the plurality of phases are fixed to on state or off state. Specifically, in the discontinuous pulse width modulation, for example, the signal levels of switching control signals for an inverter that correspond to one phase out of three-phase alternating-current electric power are sequentially fixed, and the signal levels of switching control signals corresponding to the other two phases are changed. In the continuous pulse width modulation, all phases are modulated without thus fixing switching control signals corresponding to any of the phases. These modulation schemes are determined based on operating conditions such as rotational speed and torque that are required for the rotating electrical machine 80, and a modulation index (a ratio of the root-mean-square value of line-to-line three-phase alternating-current voltages to a direct-current voltage) required to satisfy the operating conditions.

In the pulse width modulation, pulses are generated based on a magnitude relationship between the amplitude of an alternating-current waveform which is a voltage instruction and the amplitude of a waveform of a triangle wave (including a sawtooth wave) carrier (CA) (see FIGS. 5 to 10). There is also a case in which a PWM waveform is directly generated by digital computation instead of comparison with the carrier, but even in that case, the amplitude of an alternating-current waveform which is an instruction value and the amplitude of a virtual carrier waveform have a correlation.

In pulse width modulation by digital computation, a carrier is determined based on a control cycle of the rotating electrical machine control device 1, e.g., a computation cycle of the microcomputer or a duty cycle of an electronic circuit. That is, even when alternating-current electric power of a plurality of phases is used to drive the alternating-current rotating electrical machine 80, a carrier has a cycle that is not constrained by (a cycle that is not synchronized with) the rotational speed or rotational angle (electrical angle) of the rotating electrical machine 80. Thus, neither the carrier nor each pulse generated based on the carrier is synchronized with the rotation of the rotating electrical machine 80. Thus, modulation schemes such as sinusoidal pulse width modulation and space vector pulse width modulation may be referred to as asynchronous modulation. On the other hand, a modulation scheme in which pulses are generated in synchronization with the rotation of the rotating electrical machine 80 is referred to as synchronous modulation. For example, in rectangular-wave control (rectangular-wave modulation), one pulse is outputted per electrical angle cycle of the rotating electrical machine 80, and thus, the rectangular-wave modulation is synchronous modulation.

As described above, as an index indicating a conversion rate from direct-current voltage to alternating-current voltage, there is a modulation index indicating a ratio of the root-mean-square value of line-to-line alternating-current voltages of a plurality of phases to a direct-current voltage. In general, the maximum modulation index for sinusoidal pulse width modulation is about 0.61 ($\approx$0.612) and the maximum modulation index for space vector pulse width modulation control is about 0.71 ($\approx$0.707). A modulation scheme having a modulation index exceeding about 0.71 is considered a modulation scheme whose modulation index is higher than normal, and is referred to as "overmodulation pulse width modulation". The maximum modulation index for the "overmodulation pulse width modulation" is about 0.78. The value "0.78" is a physical (mathematical) limit value for electric power conversion from direct current to alternating current. In the overmodulation pulse width modulation, when the modulation index reaches 0.78, rectangular-wave modulation (single-pulse modulation) in which one pulse is outputted in one cycle of electrical angle is performed. In the rectangular-wave modulation, the modulation index is fixed to about 0.78 which is a physical limit value. Note that the values of modulation indices exemplified here are physical (mathematical) values that do not take into account dead time.

Overmodulation pulse width modulation whose modulation index is less than 0.78 can be implemented by using a principle of any of a synchronous modulation scheme and an asynchronous modulation scheme. A representative modulation scheme for the overmodulation pulse width modulation is discontinuous pulse width modulation. The discontinuous pulse width modulation can be implemented by using a principle of any of a synchronous modulation scheme and an asynchronous modulation scheme. For example, when the synchronous modulation scheme is used, in rectangular-wave modulation, one pulse is outputted in one cycle of electrical angle, whereas in discontinuous pulse width modulation, a plurality of pulses are outputted in one cycle of electrical angle. When there are a plurality of pulses in one cycle of electrical angle, a pulse active period decreases correspondingly, reducing the modulation index. Thus, not only a modulation index that is fixed to about 0.78, but also any modulation index less than 0.78 can be implemented by the synchronous modulation scheme. For example, it is also possible to perform multi-pulse modulation (Multi-Pulses) such as 9-pulse modulation (9-Pulses) in which nine pulses are outputted in one cycle of electrical angle or 5-pulse modulation (5-Pulses) in which five pulses are outputted in one cycle of electrical angle.

In addition, the rotating electrical machine control device 1 can perform shutdown control (SDN) or active short-circuit control (ASC) as fail-safe control performed when an abnormality is detected in an inverter 10 or the rotating electrical machine 80. The shutdown control is control in which an inverter 10 is brought into off state by bringing switching control signals for all switching elements 3 included in the inverter 10 into an inactive state. The active short-circuit control is control in which one side, a set of upper-stage-side switching elements 3H in arms 3A of all of the plurality of phases or a set of lower-stage-side switching elements 3L in the arms 3A of all of the plurality of phases, is brought into on state and the other side is brought into off state. Note that a case in which the upper-stage-side switching elements 3H in the arms 3A of all of the plurality of phases are brought into on state and the lower-stage-side switching elements 3L in the arms 3A of all of the plurality of phases are brought into off state is referred to as upper-stage-side active short-circuit control (ASC-H). Note also that a case in which the lower-stage-side switching elements 3L in the arms 3A of all of the plurality of phases are brought into on state and the upper-stage-side switching elements 3H in the arms 3A of all of the plurality of phases are brought into off state is referred to as lower-stage-side active short-circuit control (ASC-L).

As in the present embodiment, in a case in which each inverter 10 is connected to each end side of the stator coils 8, when one inverter 10 is short-circuited by active short-circuit control, the stator coils 8 of a plurality of phases are short-circuited in the one inverter 10. That is, the one inverter 10 serves as a neutral point and the stator coils 8 are Y-connected. Hence, the rotating electrical machine control device 1 can implement a mode in which the rotating electrical machine control device 1 controls the open-end winding type rotating electrical machine 80 through the two inverters 10 and a mode in which the rotating electrical machine control device 1 controls the Y-connected rotating electrical machine 80 through one inverter 10 (one of the inverters 10 on which active short-circuit control is not performed).

In addition, when back electromotive force generated by rotation of the rotating electrical machine 80 is large, even if all switching elements 3 are controlled to off state by shutdown control, freewheeling diodes 35 connected in parallel to the switching elements 3 are turned on. This may result in a case in which an inverter 10 on which the shutdown control is performed is short-circuited, implementing the Y-connected rotating electrical machine 80.

Figure 3:
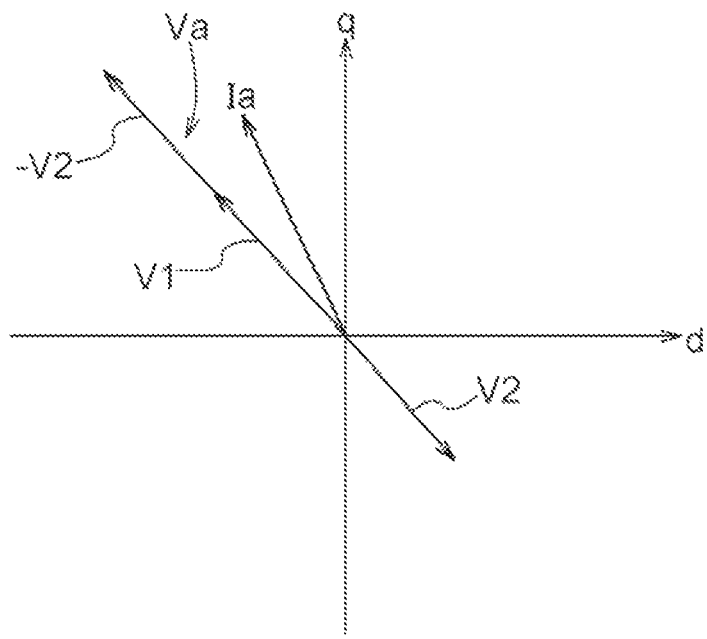
FIG. 3 is a schematic voltage vector diagram of a rotating electrical machine in an orthogonal vector space.

FIG. 3 exemplifies a vector diagram for one operating point of the rotating electrical machine 80 in a d-q-axis vector coordinate system. In the drawing, "V1" represents a first voltage vector indicating the voltage of the first inverter 11 and "V2" represents a second voltage vector indicating the voltage of the second inverter 12. Voltage that appears in the stator coils 8 which are open-end windings through the two inverters 10 corresponds to the difference "V1-V2" between the first voltage vector V1 and the second voltage vector V2. "Va" in the drawing represents a combined voltage vector that appears in the stator coils 8. In addition, "Ia" represents current flowing through the stator coils 8 of the rotating electrical machine 80. As shown in FIG. 3, when the first inverter 11 and the second inverter 12 are controlled such that the vector directions of the first voltage vector V1 and the second voltage vector V2 differ from each other by 180 degrees, the combined voltage vector Va is a vector obtained by adding the magnitude of the second voltage vector V2 to the direction of the first voltage vector V1.

Figure 4:
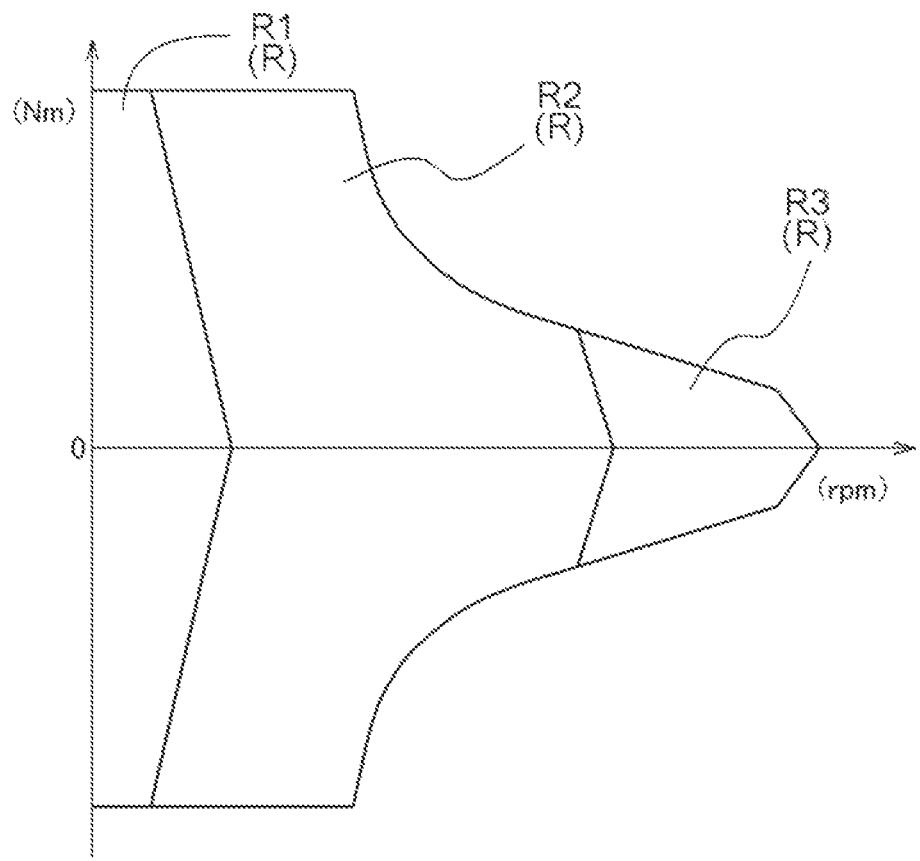
FIG. 4 is a diagram showing an example of control regions of the rotating electrical machine.

In the present embodiment, a plurality of control regions R based on the operating conditions of the rotating electrical machine 80 (see FIG. 4) are set, and the rotating electrical machine control device 1 controls the inverters 10 using control schemes set for each control region R. FIG. 4 shows an example of a relationship between the rotational speed and torque of the rotating electrical machine 80. For example, as shown in FIG. 4, as the control regions R of the rotating electrical machine 80, there are set a first speed region VR1, a second speed region VR2 in which the rotational speed of the rotating electrical machine 80 is higher than that in the first speed region VR1 with the same torque, and a third speed region VR3 in which the rotational speed of the rotating electrical machine 80 is higher than that in the second speed region VR2 with the same torque.

As described above, the rotating electrical machine control device 1 can control each of the first inverter 11 and the second inverter 12 using a plurality of control schemes with different switching patterns. The control schemes include pulse width modulation control (PWM) in which a plurality of pulses with different patterns are outputted in one cycle of electrical angle; and mixed pulse width modulation control (MX-PWM) in which control is performed such that a plurality of pulses with different patterns are outputted during a first period T1 (see FIG. 5, etc.) which is a ½ cycle (half cycle) of electrical angle (full cycle) and an inactive state continues during a second period T2 (see FIG. 5, etc.) which is the other ½ cycle (half cycle) (described later with reference to FIGS. 5 to 8). In the first speed region VR1 and the second speed region VR2, the rotating electrical machine control device 1 controls both inverters, the first inverter 11 and the second inverter 12, by mixed pulse width modulation control.

The mixed pulse width modulation control (MX-PWM) includes mixed continuous pulse width modulation control (MX-CPWM) and mixed discontinuous pulse width modulation control (MX-DPWM). Though details will be described later, in the mixed continuous pulse width modulation control, during a second period T2, control is performed such that an inactive state continues, and during a first period T1, pulse width modulation is continuously performed for all arms 3A of a plurality of phases (described later with reference to FIGS. 5 and 7). Likewise, though details will be described later, in the mixed discontinuous pulse width modulation control, during a second period T2, control is performed such that an inactive state continues, and during a first period T1, pulse width modulation is performed including a period during which switching elements 3 in an arm(s) 3A of one or more of the plurality of phases are fixed to on state or off state (described later with reference to FIGS. 6 and 8).

In the mixed pulse width modulation control, since switching control signals are in an inactive state during the second period T2, too, loss in the inverters 10 decreases, and harmonic current resulting from switching also decreases, also reducing loss (iron loss) in the rotating electrical machine 80. That is, by performing the mixed pulse width modulation control, system loss can be reduced.

For example, as shown in the following table 1, in the first speed region VR1, the rotating electrical machine control device 1 controls both inverters 10, the first inverter 11 and the second inverter 12, by mixed continuous pulse width modulation control (MX-CPWM) which will be described later. In addition, in the second speed region VR2, the rotating electrical machine control device 1 controls both inverters 10, the first inverter 11 and the second inverter 12, by mixed discontinuous pulse width modulation control (MX-DPWM) which will be described later. In addition, in the third speed region VR3, the rotating electrical machine control device 1 controls both inverters 10, the first inverter 11 and the second inverter 12, by rectangular-wave control. Mi_sys, Mi_inv1, and Mi_inv2 in the table will be described later.

TABLE 1

| R | Mi_sys | INV1 | Mi_inv1 | INV2 | Mi_inv2 |
|---|---|---|---|---|---|
| VR1 | M < a | MX-CPWM | M < a | MX-CPWM | M < a |
| VR2 | a ≤ M < 0.78 | MX - PWM | a ≤ M < 0.78 | MX - DPWM | a ≤ M < 0.78 |
| VR3 | M = 0.78 | 1 - Pulse | M = 0.78 | 1 - Pulse | M = 0.78 |

It is preferred that boundaries between the control regions R (boundaries between the first speed region VR1, the second speed region VR2, and the third speed region VR3) be set based on at least either one of the rotational speed of the rotating electrical machine 80 based on the torque of the rotating electrical machine 80 and a ratio of the root-mean-square value of line-to-line alternating-current voltages of a plurality of phases to a direct-current voltage (which may be an instruction value or may be an equivalent from an output voltage).

As exemplified in FIG. 4, the operating conditions of the rotating electrical machine 80 are often defined by a relationship between rotational speed and torque. The control regions R may be set based on rotational speed which is one parameter. Here, the rotational speed that defines boundaries between the control regions R can be set to be constant regardless of torque, but it is further preferred that the rotational speed that defines boundaries between the control regions R be set to a value that varies depending on the torque. By doing so, drive of the rotating electrical machine 80 can be controlled with high efficiency, based on the operating conditions of the rotating electrical machine 80.

In addition, for example, when the rotating electrical machine 80 requires high output (high rotational speed or high torque), a voltage-type inverter implements the requirement by increasing direct-current voltage or increasing a rate at which direct-current voltage is converted into alternating-current voltage. When direct-current voltage is constant, by increasing a rate at which the direct-current voltage is converted into alternating-current voltage, the requirement can be implemented. The rate can be represented as a ratio of the root-mean-square value of three-phase alternating-current electric power to direct-current electric power (in a case of a voltage-type inverter, it is equivalent to a ratio of the root-mean-square value of three-phase alternating-current voltages to a direct-current voltage). As described above, control schemes for controlling the inverters 10 include various schemes from a scheme in which the ratio is low to a scheme in which the ratio is high.

As shown in table 1, when the control regions R are set based on the ratio of the root-mean-square value of three-phase alternating-current electric power to direct-current electric power (modulation index) which is determined based on a requirement for the rotating electrical machine 80, drive of the rotating electrical machine 80 can be controlled with high efficiency, based on the operating conditions of the rotating electrical machine 80. Note that in the table, "Vi_inv1" represents the modulation index of the first inverter 11, "Mi_inv2" represents the modulation index of the second inverter 12, and "Mi_sys" represents the modulation index of the entire system.

The above-described table 1 exemplifies modulation indices for each control region R. In the present embodiment, a terminal-to-terminal voltage "E1" of the first direct-current power supply 61 and a terminal-to-terminal voltage "E2" of the second direct-current power supply 62 are identical (both are voltages "E"). When the root-mean-square value on the alternating-current side of the first inverter 11 is "Va_inv1" and the root-mean-square value on the alternating-current side of the second inverter 12 is "Va_inv2", the modulation index "Mi_inv1" of the first inverter 11 and the modulation index "Mi_inv2" of the second inverter 12 are as shown in the following equations (1) and (2). In addition, the modulation index "Mi_sys" of the entire system is as shown in the following equation (3).

$$Mi\_inv1 = Va\_inv1/E1 = Va\_inv1/E \quad (1)$$

$$Mi\_inv2 = Va\_inv2/E2 = Va\_inv2/E \quad (2)$$

$$Mi\_sys = (Va\_inv1 + Va\_inv2)/(E1+E2) = (Va\_inv1 + Va\_inv2)/2E \quad (3)$$

For the instantaneous value of voltage, an instantaneous vector needs to be considered, but when only the modulation index is simply considered, the modulation index "Mi_sys" of the entire system is "(Mi_inv1+Mi_inv2)/2" from equations (1) to (3). Note that table 1 shows, as rated values, modulation indices for each control region R. Hence, upon actual control, taking into account hunting occurring when a control scheme changes between control regions R, etc., modulation indices for each control region R may include an overlapping range.

Note that the modulation index "a" shown in table 1 and the modulation index "b" shown in table 2 which will be described later are set based on a theoretical upper limit value of a modulation index for each modulation scheme, and further taking into account dead time. For example, "a" is about 0.5 to 0.6, and "b" is about 0.25 to 0.3.

Figure 5:
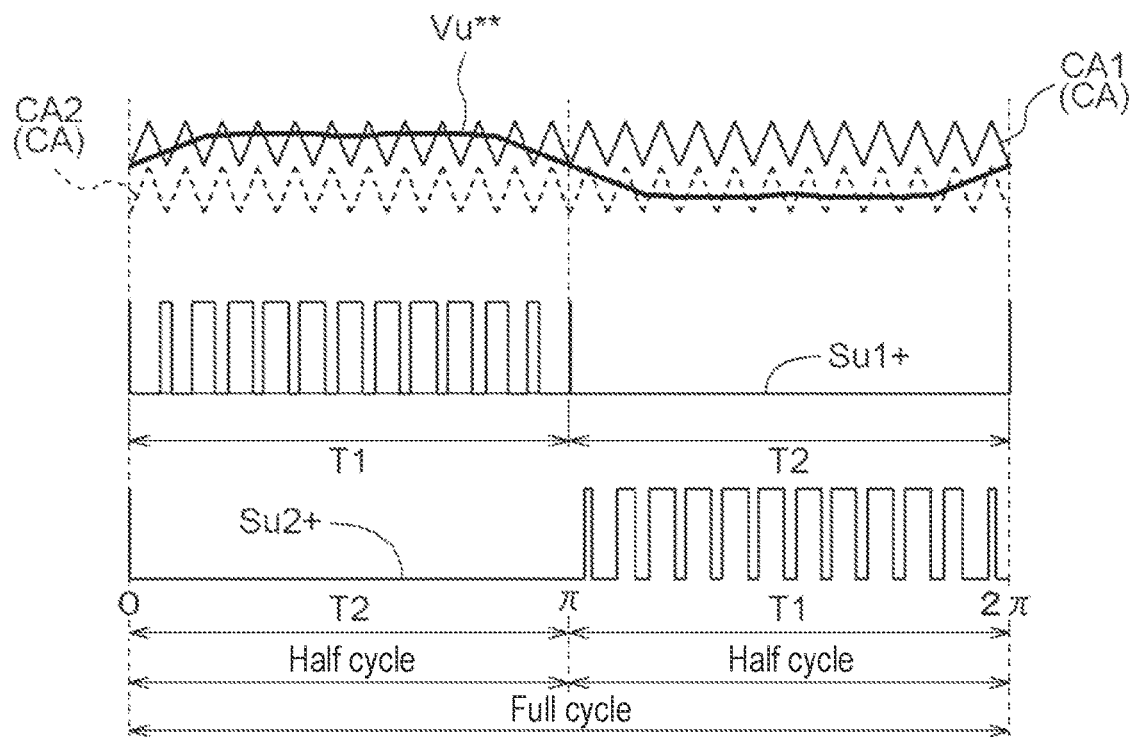
FIG. 5 is a waveform diagram showing an example of a voltage instruction and switching control signals for mixed continuous pulse width modulation (half-cycle continuous pulses).
Figure 7:
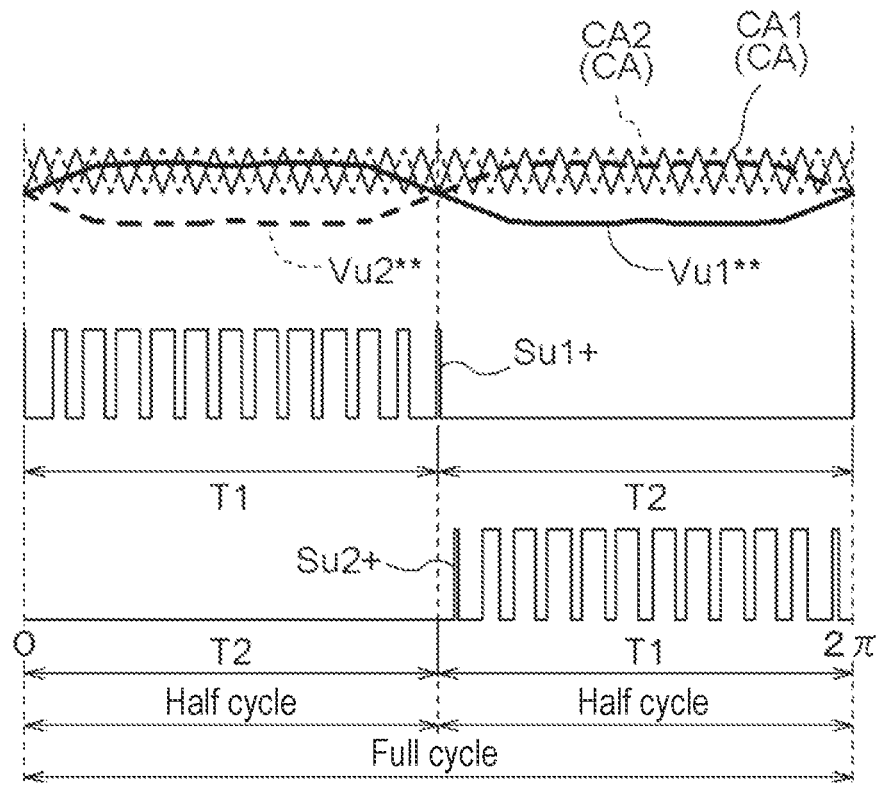
FIG. 7 is a waveform diagram showing another example of voltage instructions and switching control signals for mixed continuous pulse width modulation (half-cycle continuous pulses).
Figure 8:
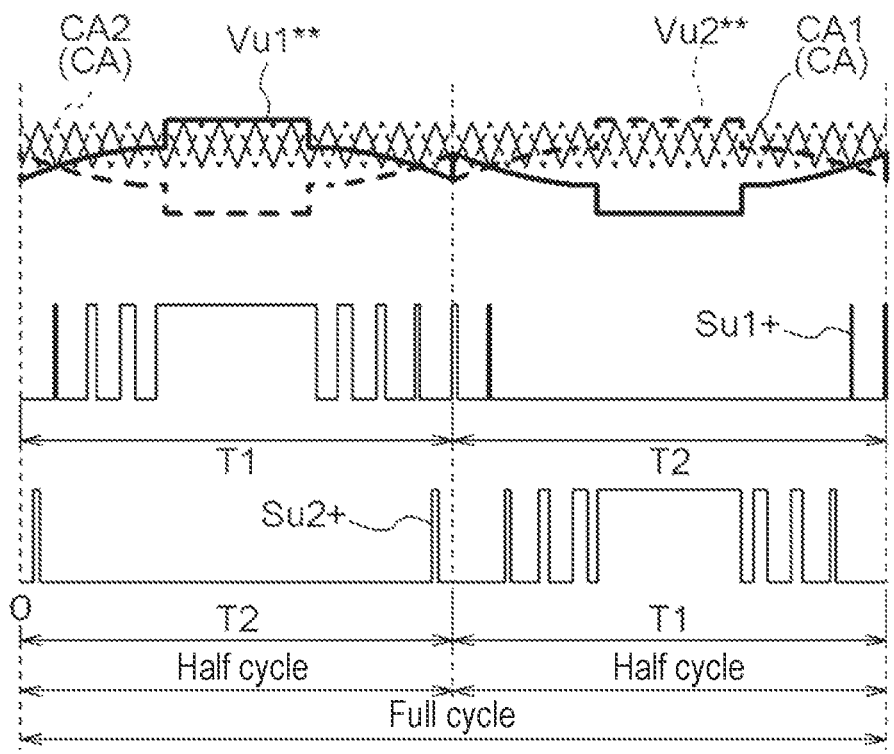
FIG. 8 is a waveform diagram showing another example of voltage instructions and switching control signals for mixed discontinuous pulse width modulation (half-cycle discontinuous pulses).

Now, with reference to FIGS. 5 to 8, mixed pulse width modulation control (MX-PWM) will be described by showing exemplary waveforms of U-phase voltage instructions (Vu1 and Vu2) and U-phase upper-stage-side switching control signals (Su1+ and Su2+). Note that depiction of a second U-phase lower-stage-side switching control signal Su2− and the V-phase and the W-phase is omitted. FIGS. 5 and 7 show exemplary waveforms for mixed continuous pulse width modulation control (MX-CPWM) and FIGS. 6 and 8 show exemplary waveforms for mixed discontinuous pulse width modulation control (MX-DPWM).

Figure 6:
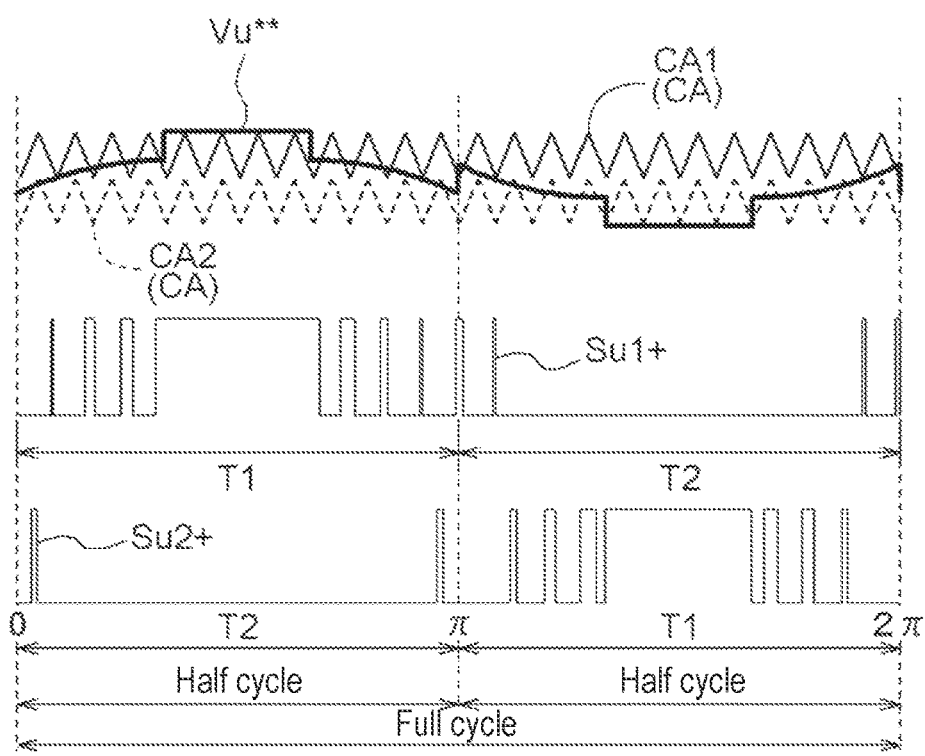
FIG. 6 is a waveform diagram showing an example of a voltage instruction and switching control signals for mixed discontinuous pulse width modulation (half-cycle discontinuous pulses).

FIGS. 5 and 6 show examples of a first carrier CA1 which is a carrier CA for the first inverter 11, a second carrier CA2 which is a carrier CA for the second inverter 12, a common U-phase voltage instruction Vu** which is a U-phase voltage instruction common to the first inverter 11 and the second inverter 12, a first U-phase upper-stage-side switching control signal Su1+, and a second U-phase upper-stage-side switching control signal Su2+. Depiction of a first U-phase lower-stage-side switching control signal Su1−, a second U-phase lower-stage-side switching control signal Su2−, and the V-phase and the W-phase is omitted (the same also applies to other control schemes).

For example, the first carrier CA1 can change between "0.5<CA1<1", the second carrier CA2 can change between "0<CA2<0.5", and the voltage instruction (V) can change between "0≤V≤1". A carrier CA (the first carrier CA1 and the second carrier CA2) is compared with a voltage instruction (V), and when the voltage instruction is greater than or equal to the carrier CA, a switching control signal is "1", and when the voltage instruction is less than the carrier CA, the switching control signal is "0". Comparative logic between the carrier CA and the voltage instruction (V) is also the same in the following description.

As shown in FIGS. 5 and 6, the amplitudes of the first carrier CA1 and the second carrier CA2 are half of an amplitude allowed for the voltage instruction (V). In general pulse width modulation, the amplitude of the carrier CA is equal to an amplitude allowed for a voltage instruction, and the carrier CA for mixed pulse width modulation can be referred to as half carrier. By using such a half carrier, during a first period T1 (half cycle) which is a ½ cycle of electrical angle (full cycle), such a half carrier crosses the voltage instruction (V), and thus, a plurality of pulses with different patterns are outputted as a switching control signal. During a second period T2 (half cycle) which is the other ½ cycle, the half carrier does not cross the voltage instruction (V**), and thus, the switching control signal is outputted such that an inactive state continues.

Note that in mixed discontinuous pulse width modulation control, as shown in FIG. 6, during the second period T2, too, pulses that are partially in an active state are outputted as a switching control signal. This results from the fact that the modulation index for discontinuous pulse width modulation which serves as the basis is large compared to that for continuous pulse width modulation. Points where the pulses in an active state are outputted during the second period T2 are near the center of the amplitude of the voltage instruction (V) and in the neighborhood of inflection points of the voltage instruction (V). As shown in FIG. 6, it can be said that in the mixed discontinuous pulse width modulation control, too, an inactive state is continuously outputted during the second period T2. In addition, when the second period T2 is only a period during which the switching control signal is in an inactive state (a period less than a ½ cycle), and is set to a period in one cycle other than the second period T2 (a period greater than or equal to a ½ cycle), mixed pulse width modulation can also be defined as follows. It can also be said that in the mixed pulse width modulation control, control is performed such that a plurality of pulses with different patterns are outputted during the first period T1 which is a ½ cycle or more of electrical angle, and an inactive state continues during the second period T2 which is the other period of one cycle of electrical angle.

FIGS. 7 and 8 exemplify a different mode of mixed continuous pulse width modulation control and mixed discontinuous pulse width modulation control than that in FIGS. 5 and 6. Switching control signals to be generated are the same. FIGS. 7 and 8 show examples of a first carrier CA1 which is a carrier CA for the first inverter 11, a second carrier CA2 which is a carrier CA for the second inverter 12, a first U-phase voltage instruction Vu1 which is a U-phase voltage instruction for the first inverter 11, a second U-phase voltage instruction Vu2 which is a U-phase voltage instruction for the second inverter 12, a first U-phase upper-stage-side switching control signal Su1+, and a second U-phase upper-stage-side switching control signal Su2+. For example, the first carrier CA1 and the second carrier CA2 can change between "0.5<CA1<1" and voltage instructions (V) can change between "0≤V≤1". The first carrier CA1 and the second carrier CA2 differ from each other in phase by 180 degrees (π). In addition, the first U-phase voltage instruction Vu1 and the second U-phase voltage instruction Vu2 also differ from each other in phase by 180 degrees (π).

As shown in FIGS. 7 and 8, the amplitudes of the first carrier CA1 and the second carrier CA2 are half of an amplitude allowed for the voltage instructions (V). Thus, carriers CA in the mode shown in FIGS. 7 and 8 each are also a half carrier. By using such a half carrier, during a first period T1 which is a ½ cycle (or a ½ cycle or more) of electrical angle, such a half carrier crosses a voltage instruction (V), and thus, a plurality of pulses with different patterns are outputted as a switching control signal. During a second period T2 which is the other period of the cycle, the half carrier does not cross the voltage instruction (V**), and thus, the switching control signal is outputted such that an inactive state continues.

The mode exemplified in FIGS. 5 and 6 is a scheme in which modulation is performed using two half carriers and one common reference voltage instruction (V), and thus can be said to be a double half-carrier and single reference scheme. On the other hand, the mode exemplified in FIGS. 7 and 8 is a scheme in which modulation is performed using two half carriers and two voltage instructions (V), and thus can be said to be a double half-carrier and double reference scheme.

As described above with reference to FIGS. 5 to 8, in the mixed pulse width modulation control, a plurality of pulses are generated based on a half carrier (the first carrier CA1 and the second carrier CA2) which is a carrier CA with the ½ wave height of a variable range of an instruction value (a voltage instruction; in the above-described examples, the U-phase voltage instruction (Vu(Vu=Vu1=Vu2), Vu1, and Vu2)), and the instruction value. In the present embodiment, as schemes for the mixed pulse width modulation control, two schemes are exemplified: the double half-carrier and single reference scheme and the double half-carrier and double reference scheme.

In the double half-carrier and single reference scheme, as described with reference to FIGS. 5 and 6, pulses for the first inverter 11 are generated based on a first half carrier (the first carrier CA1) that is set, as a half carrier, on one of a higher voltage side and a lower voltage side (here, the higher voltage side) than the center of the amplitude of an instruction value (the common U-phase voltage instruction Vu), and the instruction value (the common U-phase voltage instruction Vu) common to the first inverter 11 and the second inverter 12. In addition, in this scheme, pulses for the second inverter 12 are generated based on a second half carrier (the second carrier CA2) that has the same phase as the first half carrier (the first carrier CA1) and that is set on the other one of the higher voltage side and the lower voltage side (here, the lower voltage side) than the center of the amplitude of the instruction value (the common U-phase voltage instruction Vu), and the instruction value (the common U-phase voltage instruction Vu).

In the double half-carrier and double reference scheme, as described with reference to FIGS. 7 and 8, pulses for the first inverter 11 are generated based on a first half carrier (the first carrier CA1) that is set, as a half carrier, on one of a higher voltage side and a lower voltage side (here, the higher voltage side) than the centers of the amplitudes of instruction values (the first U-phase voltage instruction Vu1 and the second U-phase voltage instruction Vu2), and a first instruction value for the first inverter 11 (the first U-phase voltage instruction Vu1). In addition, in this scheme, pulses for the second inverter 12 are generated based on a second half carrier (the second carrier CA2) that differs in phase by 180 degrees from the first half carrier (the first carrier CA1) and that is set on the same side (the higher voltage side) as the first half carrier (the first carrier CA1), and a second instruction value for the second inverter 12 (the second U-phase voltage instruction Vu2) that differs in phase by 180 degrees from the first instruction value (the first U-phase voltage instruction Vu1**).

Figure 9:
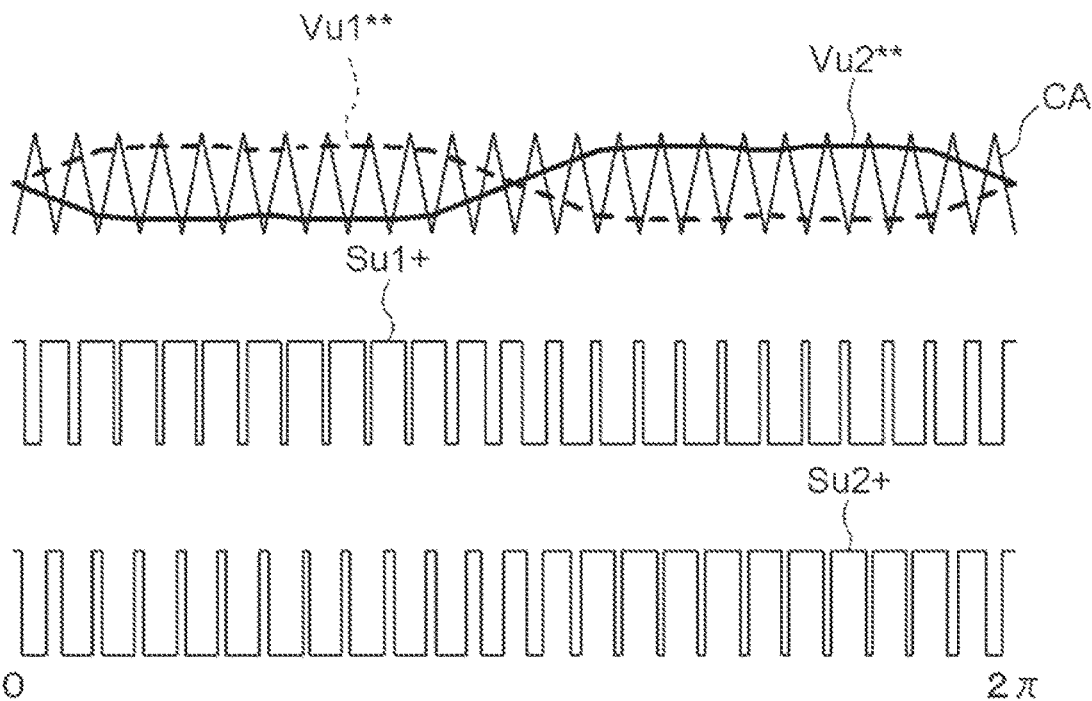
FIG. 9 is a waveform diagram showing an example of voltage instructions and switching control signals for continuous pulse width modulation.
Figure 10:
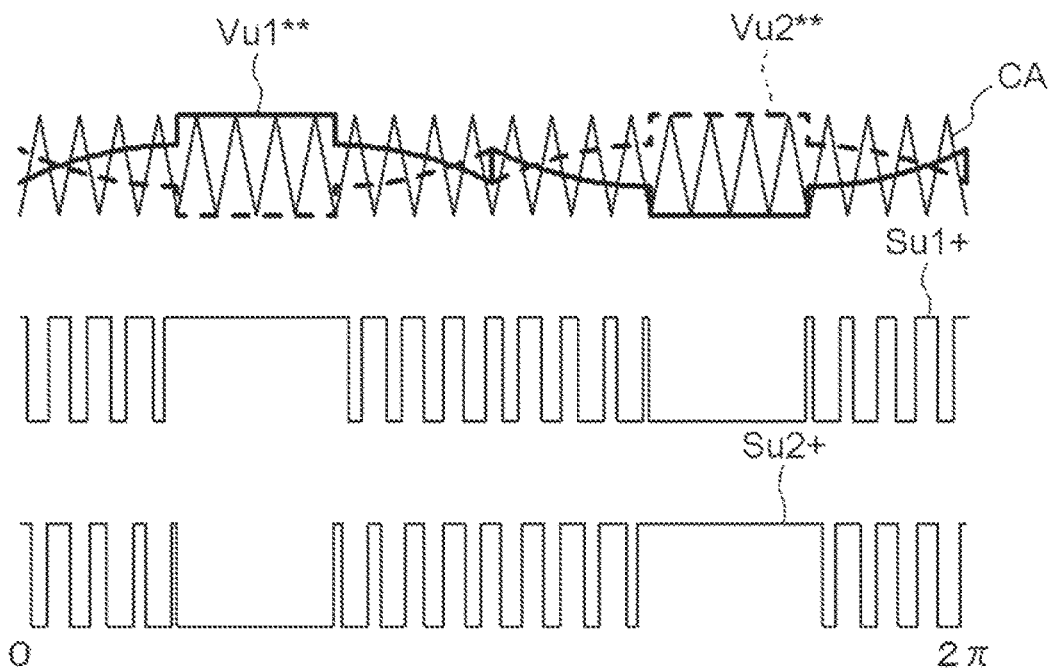
FIG. 10 is a waveform diagram showing an example of voltage instructions and switching control signals for discontinuous pulse width modulation.

Note that as will be described later with reference to table 2, in the first speed region VR1 and the second speed region VR2, the inverters 10 may be controlled by pulse width modulation instead of mixed pulse width modulation. FIG. 9 shows an example of a first U-phase voltage instruction Vu1, a second U-phase voltage instruction Vu2, a carrier CA, a first U-phase upper-stage-side switching control signal Su1+, and a second U-phase upper-stage-side switching control signal Su2+ for a case in which in the first speed region VR1, both the first inverter 11 and the second inverter 12 are controlled by continuous pulse width modulation control. In addition, FIG. 10 shows an example of a first U-phase voltage instruction Vu1, a second U-phase voltage instruction Vu2, a carrier CA, a first U-phase upper-stage-side switching control signal Su1+, and a second U-phase upper-stage-side switching control signal Su2+ for a case in which in the second speed region VR2, both the first inverter 11 and the second inverter 12 are controlled by discontinuous pulse width modulation control.

When switching control is performed on both the first inverter 11 and the second inverter 12, the first U-phase voltage instruction Vu1 and the second U-phase voltage instruction Vu2 have phases different from each other by approximately 180 degrees. For example, the maximum amplitude of U-phase voltage is "(4/3)E" and the maximum amplitude of line-to-line voltage is "2E" (see also the vector diagram of FIG. 3). Note that the first direct-current power supply 61 and the second direct-current power supply 62 are independent of each other, and a first voltage E1 of the first direct-current power supply 61 and a second voltage E2 of the second direct-current power supply 62 may have different values. For example, to be precise, the maximum amplitude of U-phase voltage is "((2/3)E1)+((2/3)E2)", but for easy understanding, in this specification, "E1=E2=E". To the rotating electrical machine 80 is supplied equal electric power from the two inverters 10. At this time, identical voltage instructions (V**) with phases different from each other by 180 degrees ($\pi$) are provided to both inverters 10.

Meanwhile, when switching control is performed on the inverters 10, ripple components superimposed on an alternating-current fundamental may generate noise in an audio frequency band. When the two inverters 10 are controlled by pulses having different modes, a ripple based on each pulse occurs, which may increase noise in the audio frequency band. Particularly, when the rotational speed of the rotating electrical machine 80 is low, the possibility of inclusion of the frequency of ripple components (or sideband frequencies thereof) in the audio frequency band increases. It is desirable to appropriately set control schemes for the rotating electrical machine 80, i.e., control schemes for the inverters 10, based on operating conditions so that both of operation with high system efficiency and a reduction in audible noise can be achieved.

The rotating electrical machine control device 1 of the present embodiment has, as control modes of the rotating electrical machine 80, a loss reduction priority mode (efficiency priority mode) and a noise reduction priority mode in a switchable manner. In the loss reduction priority mode, as described above with reference to table 1, the rotating electrical machine control device 1 performs switching control on the inverters 10 using mixed pulse width modulation control. In the noise reduction priority mode, as exemplified in the following table 2, the rotating electrical machine control device 1 performs switching control on the inverters 10 using pulse width modulation control.

TABLE 2

| R | Mi_sys | INV1 | Mi_inv1 | INV2 | Mi_inv2 |
|---|---|---|---|---|---|
| VR1 | M < b | CPWM | M < b | CPWM | M < b |
| VR2-2 | b ≤ M < 0.78 | DPWM | b ≤ M < 0.78 | DPWM | b ≤ M < 0.78 |
| VR3 | M = 0.78 | 1-Pulse | M = 0.78 | 1-Pulse | M = 0.78 |

When switching control is performed on the inverters 10, ripple components superimposed on an alternating-current fundamental may generate noise in the audio frequency band. Particularly, when the rotational speed of the rotating electrical machine 80 is low, the possibility of inclusion of the frequency of ripple components (or sideband frequencies thereof) in the audio frequency band increases. In mixed pulse width modulation, as shown in FIGS. 5 to 8, during a half cycle of electrical angle, the two inverters 10 are controlled using different modes of pulses, and thus, a ripple based on each pulse occurs, and there is a possibility of increase in noise in the audio frequency band. In the first speed region VR1 and the second speed region VR2 in which the rotational speed of the rotating electrical machine 80 is relatively low, sound associated with travel of the vehicle (traveling sound such as sound of tires contacting a road surface) is also small, and thus, when noise outputted from one inverter 10 to be driven is noise in the audio frequency band, there is a possibility that the noise is likely to be audible to a user.

For example, it is preferred that upon the start of the vehicle or upon deceleration to make a stop, taking into account the fact that noise in the audio frequency band is likely to be audible to the user, the noise reduction priority mode be selected, and upon steady-state driving where the vehicle travels in a steady state, the loss reduction priority mode be selected. Note that these modes may be selected by a user's operation (a setting switch (also including input from a touch panel, etc.)).

In the noise reduction priority mode, in the first speed region VR1 and the second speed region VR2 in which the rotational speed of the rotating electrical machine 80 is relatively low, the first inverter 11 and the second inverter 12 are controlled by pulse width modulation control instead of mixed pulse width modulation control. In the two inverters 10 that allow currents to flow through the stator coils 8, the phases of the currents differ from each other by substantially 180 degrees, and thus, the phases of the currents including ripple components differ from each other by substantially 180 degrees. Thus, at least some of the ripple components can cancel each other out, enabling a reduction in noise in the audio frequency band.

As described above, the rotating electrical machine 80 having open-end windings of a plurality of phases that are independent of each other is appropriately controlled by the rotating electrical machine control device 1 that can control the first inverter 11 and the second inverter 12 independently of each other. Meanwhile, as described above, in the rotating electrical machine control system 100, between a direct-current power supply 6 connected to each inverter 10, and the inverter 10 and a smoothing capacitor 4 there is provided a contactor 9 such as a relay for establishing and cutting off an electrical connection between the direct-current power supply 6, and the inverter 10 and the smoothing capacitor 4. If the contactor 9 goes into a state of cutting off an electrical connection (a state in which an open failure has occurred) due to a failure, etc., with the rotating electrical machine 80 rotating, then supply of electric power from the direct-current power supply 6 to the inverter 10 may be interrupted, or a terminal-to-terminal voltage of the smoothing capacitor 4 may rise because back electromotive force of the rotating electrical machine 80 cannot be regenerated to the direct-current power supply 6.

As described above, the rotating electrical machine control device 1 can control the first inverter 11 and the second inverter 12 independently of each other, and if, for example, an open failure has occurred in either one of the contactors 9, then the rotating electrical machine control device 1 cannot control the rotating electrical machine 80 by performing switching control on an inverter 10 connected to the contactor 9 having the failure. However, as described above, by performing active short-circuit control on one of the inverters 10, the inverter 10 is short-circuited, creating a neutral point of the stator coils 8, by which as a rotating electrical machine having the Y-connected stator coils 8, drive of the rotating electrical machine 80 can be controlled (single-inverter torque control mode). To do so, it is desirable to identify a contactor 9 having a failure, and to ease, at an early stage, a transitional state occurring due to occurrence of the failure to appropriately perform a single-inverter torque control mode.

In the rotating electrical machine control system 100 of the present embodiment, the rotating electrical machine control device 1 identifies a contactor 9 having a failure, and appropriately performs fail-safe control according to a control state, etc., at the time based on the failure of the contactor 9. Here, the fail-safe control refers to control in which a transitional state occurring due to occurrence of an open failure in a contactor 9 is eased at an early stage to appropriately perform a single-inverter torque control mode.

As described above, the rotating electrical machine control system 100 that controls drive of the rotating electrical machine 80 having open-end windings (the stator coils 8) of a plurality of phases that are independent of each other includes the first inverter 11 connected to the one-end side of the open-end windings: the second inverter 12 connected to the other-end side of the open-end windings; the first direct-current power supply 61 to which the first inverter 11 is connected; the second direct-current power supply 62 to which the second inverter 12 is connected; the first smoothing capacitor 41 connected in parallel to the first direct-current power supply 61; the second smoothing capacitor 42 connected in parallel to the second direct-current power supply 62; the first contactor 91 that establishes and cuts off an electrical connection between the first inverter 11 and the first smoothing capacitor 41, and the first direct-current power supply 61; the second contactor 92 that establishes and cuts off an electrical connection between the second inverter 12 and the second smoothing capacitor 42, and the second direct-current power supply 62; and the rotating electrical machine control device 1 (control part) that controls each of the first contactor 91 and the second contactor 92 and can control the first inverter 11 and the second inverter 12 independently of each other.

Though details will be described later with reference to FIGS. 11 to 23, when a voltage (first direct-current link voltage Vdc1) at both ends of the first smoothing capacitor 41 is higher than a first upper limit voltage VrefH1 or lower than a first lower limit voltage VrefL1 and a current (first battery current Ib1) flowing through the first direct-current power supply 61 is less than or equal to a predefined first lower limit current Iref1, the rotating electrical machine control device 1 determines that the first contactor 91 is in an open state. In addition, when a voltage (second direct-current link voltage Vdc2) at both ends of the second smoothing capacitor 42 is higher than a second upper limit voltage VrefH2 or lower than a second lower limit voltage VrefL2 and a current (second battery current Ib2) flowing through the second direct-current power supply 62 is less than or equal to a predefined second lower limit current Iref2, the rotating electrical machine control device 1 determines that the second contactor 92 is in an open state. Here, these determination processes are referred to as contactor open determination processes. In addition, one of the contactors 9, the first contactor 91 or the second contactor 92, that is determined to be in an open state in a contactor open determination process is considered a failed contactor, and the other contactor 9 is considered a normal contactor.

Note that the first upper limit voltage VrefH1 is set to a value larger than a voltage fluctuation range of the first direct-current power supply 61. For example, when the rated voltage of the first direct-current power supply 61 is 300 [V] and a voltage fluctuation of ±25% is allowed, the voltage fluctuation range is 220 [V] to 380 [V]. Thus, the first upper limit voltage VrefH1 is set to, for example, 400 [V]. The first lower limit voltage VrefL1 is set to a value smaller than the voltage fluctuation range of the first direct-current power supply 61. In the aforementioned example, the first lower limit voltage VrefL1 is set to a value less than 220 [V] and is set to, for example, 200 [V]. Likewise, the second upper limit voltage VrefH2 is set to a value larger than a voltage fluctuation range of the second direct-current power supply 62, and the second lower limit voltage VrefL2 is set to a value smaller than the voltage fluctuation range of the second direct-current power supply 62. In the present embodiment, the first direct-current power supply 61 and the second direct-current power supply 62 have the same rated voltage and the same specifications, and the first upper limit voltage VrefH1 and the second upper limit voltage VrefH2 are set to the same value. In addition, the first lower limit voltage VrefL1 and the second lower limit voltage VrefL2 are also set to the same value. In such a case, the first upper limit voltage VrefH1 and the second upper limit voltage VrefH2 may be simply referred to as upper limit voltage VrefH without distinguishing therebetween, and the first lower limit voltage VrefL1 and the second lower limit voltage VrefL2 may be simply referred to as lower limit voltage VrefL without distinguishing therebetween, Needless to say, the first upper limit voltage VrefH1 and the second upper limit voltage VrefH2 may be set to different values, and the first lower limit voltage VrefL1 and the second lower limit voltage VrefL2 may be set to different values.

Figure 11:
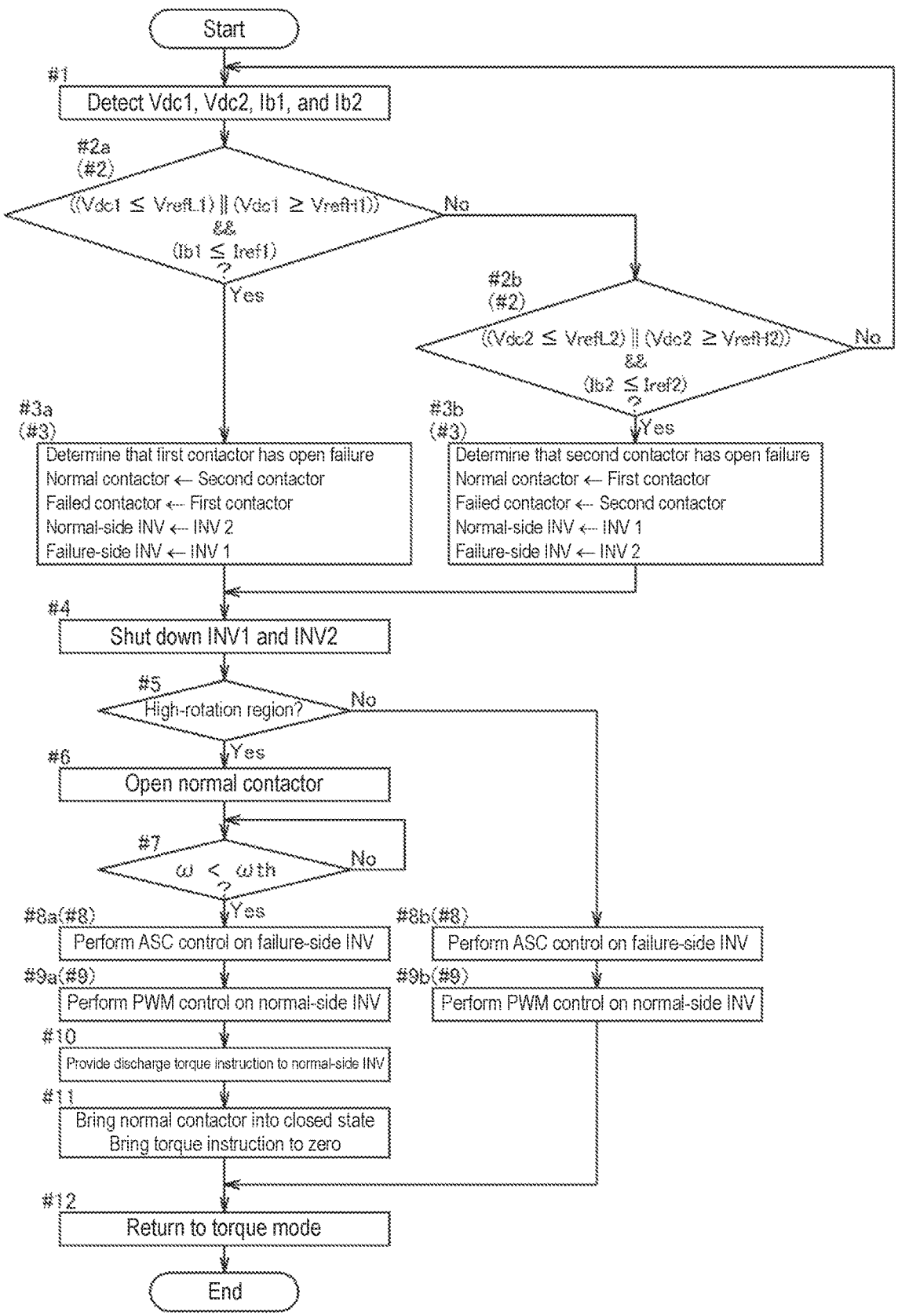
FIG. 11 is a flowchart showing an example of detection of an open failure of a contactor and fail-safe control.

With reference to FIGS. 11 to 23, detection of an open failure of a contactor and fail-safe control will be specifically described below. A flowchart of FIG. 11 shows an example of a procedure of detection of an open failure of a contactor and fail-safe control. Timing charts of FIGS. 12 to 23 show examples of operation performed upon detection of an open failure of a contactor and fail-safe control. FIGS. 12 to 15 show an example case in which the rotational speed of the rotating electrical machine 80 is a relatively high rotational speed (e.g., 13000 [rpm] or more), FIGS. 20 to 23 show an example case in which the rotational speed of the rotating electrical machine 80 is a relatively low rotational speed (e.g., less than 5000 [rpm]), and FIGS. 16 to 19 show an example in which the rotational speed of the rotating electrical machine 80 is an intermediate rotational speed between the relatively high rotational speed and the relatively low rotational speed (e.g., around 9000 [rpm]). FIGS. 12, 13, 16, 17, 20, and 21 show an example case in which the rotating electrical machine 80 is performing regenerative operation, and FIGS. 14, 15, 18, 19, 22, and 23 show an example case in which the rotating electrical machine 80 is performing powering operation. In addition, FIGS. 12, 14, 16, 18, 20, and 22 show an example in which fail-safe control is performed with a normal contactor maintaining a closed state, and FIGS. 13, 15, 17, 19, 21, and 23 show an example in which fail-safe control is performed with the normal contactor being also in an open state. The flowchart shown in FIG. 11 shows an example in which fail-safe control is performed with the normal contactor being also in an open state.

In addition, in the timing charts of FIGS. 12 to 23, a case of the contactor 9 being in an open state is represented as "OPEN" and a case of the contactor 9 being in a closed state is represented as "CLOSE". For the control modes of the first inverter 11 and the second inverter 12, as described with reference to tables 1 and 2 and FIGS. 1 to 10, a control mode in which the inverters 10 are driven by pulse width modulation control (also including rectangular-wave modulation control) based on a torque instruction is represented as a "torque mode". In addition, as described above, shutdown control is represented as "SDN" and active short-circuit control is represented as "ASC". The voltage values of the first direct-current link voltage Vdc1 and the second direct-current link voltage Vdc2 at normal times are a first normal voltage Vtyp1 and a second normal voltage Vtyp2, respectively. At ratings, the first normal voltage Vtyp1 and the second normal voltage Vtyp2 are identical voltages, and when the first normal voltage Vtyp1 and the second normal voltage Vtyp2 are not distinguished from each other, the first normal voltage Vtyp1 and the second normal voltage Vtyp2 are simply referred to as normal voltage Vtyp. As will be described later, the value of the direct-current link voltage Vdc varies depending on the open/close of the contactor 9, etc. In FIGS. 12 to 23, the voltage value of the direct-current link voltage Vdc is represented as V52, V38, V48, etc. The larger number indicates a higher voltage. In addition, for the rotational speed of the rotating electrical machine 80, too, likewise, in FIGS. 12 to 23, the rotational speed is represented as R15, R3, etc. For the rotational speed, too, the larger number indicates a higher rotational speed. Note that though details will be described later, MD1 represents a dual-inverter torque control mode, MD2 represents a shutdown control mode (non-torque control mode), and MD3 represents a single-inverter torque control mode.

As shown in FIG. 11, the rotating electrical machine control device 1 first detects a voltage (first direct-current link voltage Vdc1) at both ends of the first smoothing capacitor 41, a voltage (second direct-current link voltage Vdc2) at both ends of the second smoothing capacitor 42, a current (first battery current Ib1) flowing through the first direct-current power supply 61, and a current (second battery current Ib2) flowing through the second direct-current power supply 62 (#1). The first direct-current link voltage Vdc1 and the second direct-current link voltage Vdc2 (collectively referred to as direct-current link voltages Vdc) each are detected by being measured by a voltage sensor which is not shown in FIG. 1, etc., and obtained by the rotating electrical machine control device 1 through an in-vehicle network, e.g., a controller area network (CAN). The first battery current Ib1 and the second battery current Ib2 each are also detected by being measured by a current sensor which is not shown in FIG. 1, etc., and obtained by the rotating electrical machine control device 1 through an in-vehicle network, e.g., the CAN. The rotating electrical machine control device 1 detects the first direct-current link voltage Vdc1, the second direct-current link voltage Vdc2, the first battery current Ib1, and the second battery current Ib2 based on a control cycle of vector control. When a detection period is long, resolution decreases, and when the detection period is too short, the capacity of a temporary storage device such as a memory is consumed and a computing load increases. Thus, it is preferred that the first direct-current link voltage Vdc1, the second direct-current link voltage Vdc2, the first battery current Ib1, and the second battery current Ib2 be detected, for example, once every control cycle of vector control.

Then, the rotating electrical machine control device 1 determines whether the first direct-current link voltage Vdc1 is higher than the first upper limit voltage VrefH1 or the first direct-current link voltage Vdc1 is lower than the first lower limit voltage VrefL1, and the first battery current Ib1 is less than or equal to the first lower limit current Iref1 (#2a). When these conditions are satisfied, the rotating electrical machine control device 1 determines that the first contactor 91 has an open failure, and sets the first contactor 91 as a failed contactor and sets the second contactor 92 which is the other one as a normal contactor. In addition, the first inverter 11 which is one of the inverters 10 to which the first contactor 91, the failed contactor, is connected is set as a failure-side inverter, and the second inverter 12 which is one of the inverters 10 to which the second contactor 92, the normal contactor, is connected is set as a normal-side inverter (#3a).

Likewise, the rotating electrical machine control device 1 determines whether the second direct-current link voltage Vdc2 is higher than the second upper limit voltage VrefH2 or the second direct-current link voltage Vdc2 is lower than the second lower limit voltage VrefL2, and the second battery current Ib2 is less than or equal to the second lower limit current Iref2 (#2b). When these conditions are satisfied, the rotating electrical machine control device 1 determines that the second contactor 92 has an open failure, and sets the second contactor 92 as a failed contactor and sets the first contactor 91 which is the other one as a normal contactor. In addition, the second inverter 12 which is one of the inverters 10 to which the second contactor 92, the failed contactor, is connected is set as a failure-side inverter, and the first inverter 11 which is one of the inverters 10 to which the first contactor 91, the normal contactor, is connected is set as a normal-side inverter (#3b).

Note that although the flowchart exemplified in FIG. 11 exemplifies a mode in which if the conditions are not satisfied at step #3a, then step #3b is performed, they may be performed in reversed order. When steps #2a and #2b are collectively referred to, they are referred to as step #2, and when steps #3a and #3b are collectively referred to, they are referred to as step #3. Step #2 corresponds to the above-described contactor open determination process. In addition, the first lower limit current Iref1 and the second lower limit current Iref2 each are set to a value close to zero and larger than the maximum value of an error of a current sensor that measures the battery currents Ib.

Here, the timing charts of FIGS. 12 to 23 are referred to. At first, the first contactor 91 and the second contactor 92 are in a closed state (CLOSE), and the inverters 10 and the smoothing capacitors 4 are electrically connected to their corresponding direct-current power supplies 6, which is common to FIGS. 12 to 23. The first inverter 11 (INV1) and the second inverter 12 (INV2) both are controlled by a torque mode (dual-inverter torque control mode). The first direct-current link voltage Vdc1 and the second direct-current link voltage Vdc2 are the first normal voltage Vtyp1 and the second normal voltage Vtyp2, respectively, and are both the normal voltages Vtyp.

In addition, when the rotating electrical machine 80 is performing regenerative operation, negative torque is outputted (FIGS. 12, 13, 16, 17, 20, and 21), and when the rotating electrical machine 80 is performing powering operation, positive torque is outputted (FIGS. 14, 15, 18, 19, 22, and 23). The rotational speed rises to R15 in a case of the high rotational speed (FIGS. 12 to 15), rises to R9 in a case of the intermediate rotational speed (FIGS. 16 to 19), and rises to R3 in a case of the low rotational speed (FIGS. 20 to 23). Here, at time t1, an open failure occurs in the second contactor 92 and the second contactor 92 goes into an open state (OPEN), which is common to FIGS. 12 to 23.

If the second contactor 92 goes into an open state, then when the rotating electrical machine 80 is performing regenerative operation, generated electric power is not regenerated to the second direct-current power supply 62, and thus, the second smoothing capacitor 42 is charged. Hence, the second direct-current link voltage Vdc2 which is the voltage at both ends of the second smoothing capacitor 42 rises from the second normal voltage Vtyp2 (FIGS. 12, 13, 16, 17, 20, and 21). As is clear from a comparison of FIGS. 12, 16, and 20 and a comparison of FIGS. 13, 17, and 21, the higher the rotational speed of the rotating electrical machine 80, the larger the rising voltage. At time t21 (t2), the rising second direct-current link voltage Vdc2 reaches the second upper limit voltage VrefH2. Though not shown in the timing charts, by the second contactor 92 going into an open state, the second battery current Ib2 reaches substantially zero, and thus, the condition that the second battery current Ib2 is less than or equal to the second lower limit current Iref2 is satisfied. When the second direct-current link voltage Vdc2 reaches the second upper limit voltage VrefH2, the conditions at step #2 (#2b) of FIG. 11 are satisfied.

On the other hand, when the rotating electrical machine 80 is performing powering operation, supply of electric power from the second direct-current power supply 62 to the rotating electrical machine 80 is interrupted, and the rotating electrical machine 80 performs powering using electric power stored in the second smoothing capacitor 42. That is, electric power is supplied from the second smoothing capacitor 42 to the rotating electrical machine 80, and the second direct-current link voltage Vdc2 which is the voltage at both ends of the second smoothing capacitor 42 drops from the second normal voltage Vtyp2 (FIGS. 14, 15, 18, 19, 22, and 23). At time t22 (t2), the dropping second direct-current link voltage Vdc2 reaches less than or equal to the second lower limit voltage VrefL2. Though not shown in the timing charts, by the second contactor 92 going into an open state, the second battery current Ib2 reaches substantially zero, and thus, the condition that the second battery current Ib2 is less than or equal to the second current lower limit value is satisfied. When the second direct-current link voltage Vdc2 reaches less than or equal to the second lower limit voltage VrefL2, the conditions at step #2 (#2b) of FIG. 11 are satisfied.

When the conditions at step #2 of FIG. 11 are satisfied, i.e., when an open failure of a contactor 9 is detected, the rotating electrical machine control device 1 performs shutdown control on both the first inverter 11 and the second inverter 12 (#4). Namely, at time t2, the operating mode of the first inverter 11 and the second inverter 12 transitions from the torque control mode (dual-inverter torque control mode MD1) to the shutdown control mode MD2 (non-torque control mode), which is common to FIGS. 12 to 23.

The rotating electrical machine control device 1 then determines whether the operating region of the rotating electrical machine 80 is a high-rotation region (#5). If the operating region of the rotating electrical machine 80 is a high-rotation region, then the normal contactor which is, in this case, the first contactor 91 is brought into an open state (OPEN) (#6 and FIGS. 13, 15, 17, 19, 21, and 23). FIGS. 14, 16, 18, 20, and 22 exemplify a case in which the first contactor 91 does not go into an open state (OPEN). For example, FIGS. 20 and 22 exemplify a case of the low rotational speed, and exemplifies a case in which it is determined at step #5 of FIG. 11 that the operating region is not a high-rotation region. Though details will be described later, a mode can also be adopted in which even if the operating region of the rotating electrical machine 80 is a high-rotation region, the normal contactor is not brought into an open state (OPEN). FIGS. 14 and 16 (also including FIGS. 18 and 20 which are timing charts for the intermediate rotational speed) exemplify such a mode. In addition, FIGS. 21 and 23 show, as a comparative example, an example case in which when the rotational speed of the rotating electrical machine 80 is the low rotational speed, too, the normal contactor is brought into an open state.

Figure 12:
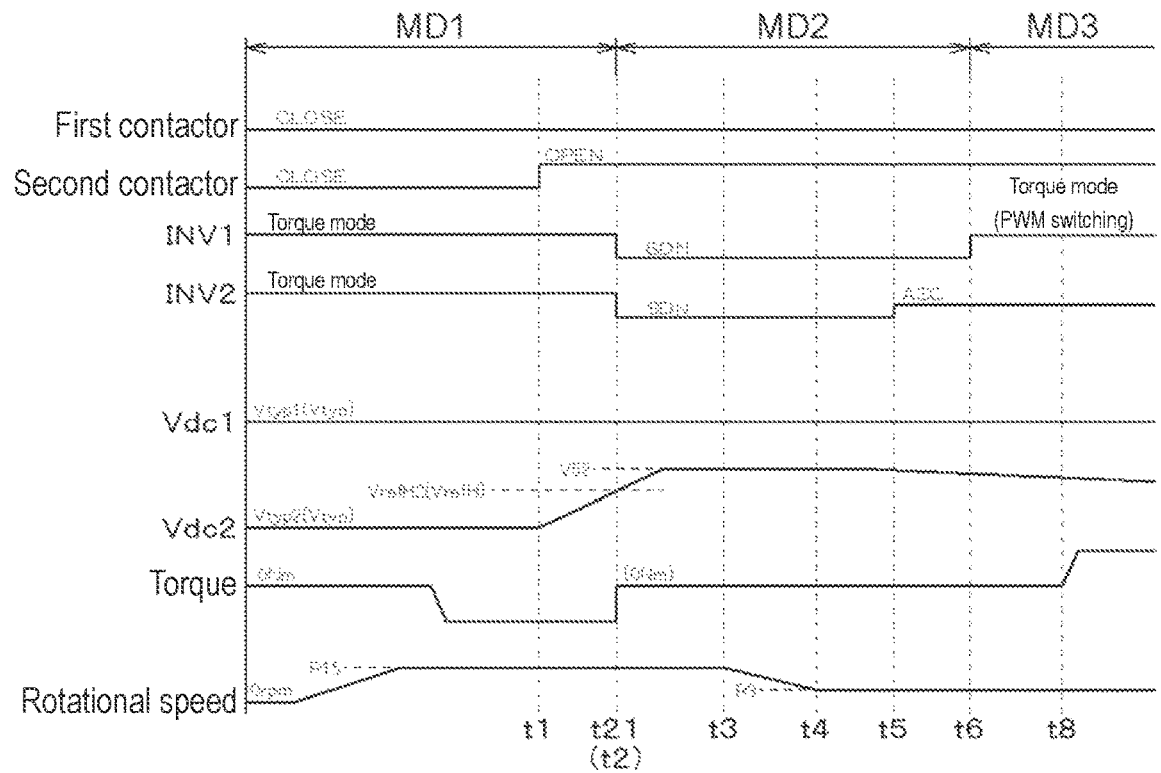
FIG. 12 is a timing chart showing an example of detection of an open failure of a contactor and fail-safe control upon high rotational speed and regeneration (an example in which a normal contactor maintains a closed state).
Figure 13:
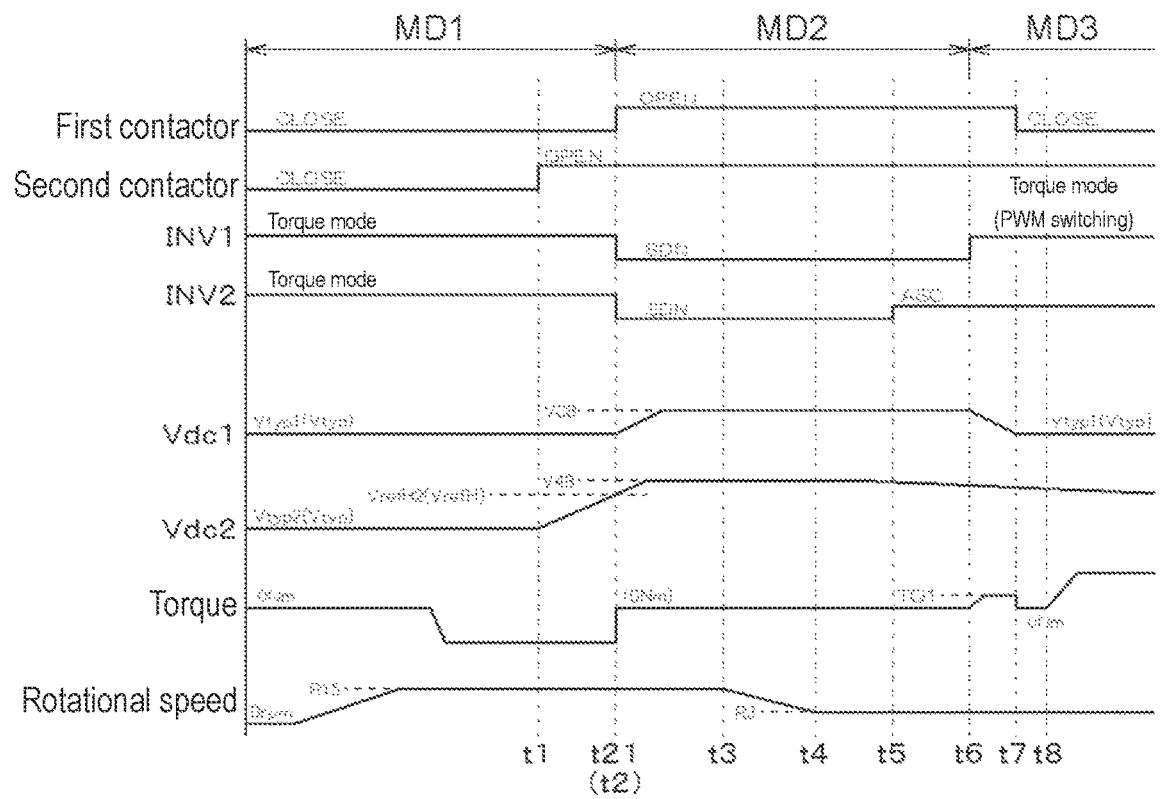
FIG. 13 is a timing chart showing an example of detection of an open failure of a contactor and fail-safe control upon high rotational speed and regeneration (an example in which the normal contactor is also in an open state).
Figure 14:
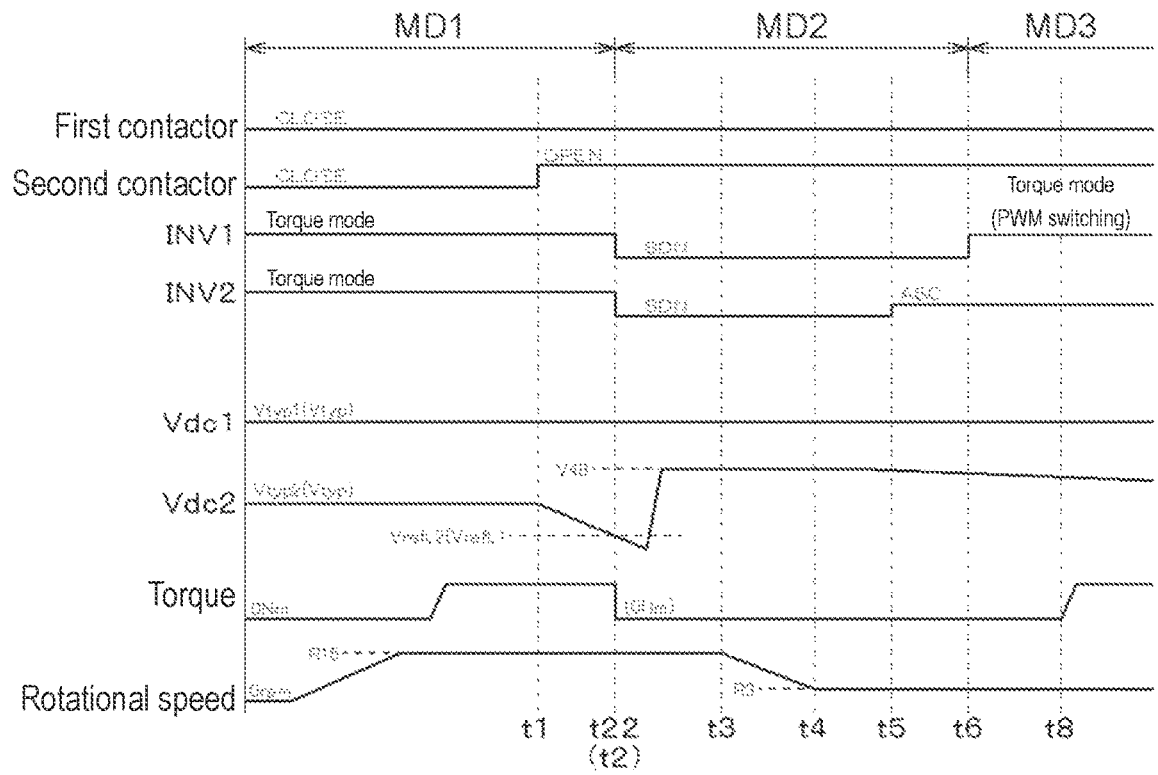
FIG. 14 is a timing chart showing an example of detection of an open failure of a contactor and fail-safe control upon high rotational speed and powering (an example in which a normal contactor maintains a closed state).

For example, when FIG. 13 in which the first contactor 91 goes into an open state at time t2 (time t21) is compared with FIG. 12 in which the first contactor 91 continues to be in a closed state (CLOSE) at time t2 (t22), too, for the second direct-current link voltage Vdc2, "V52" of FIG. 12 in which the first contactor 91 continues to be in a closed state is higher than "V48" of FIG. 13 in which the first contactor 91 is also in an open state. When the first contactor 91 goes into an open state, regenerative electric power flows through the first smoothing capacitor 41 and the second smoothing capacitor 42, charging the two smoothing capacitors 4. In the closed state of the first contactor 91, only the second smoothing capacitor 42 is charged, and thus, a voltage rise in the second direct-current link voltage Vdc2 increases.

Figure 15:
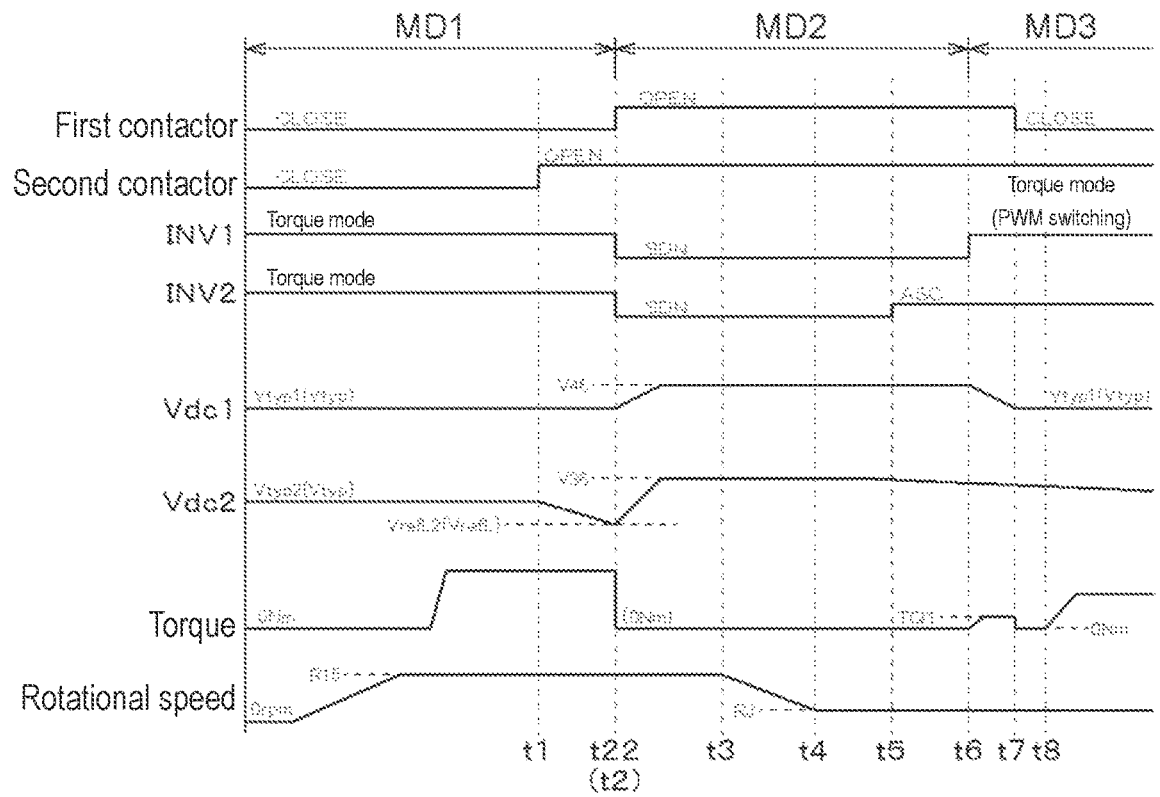
FIG. 15 is a timing chart showing an example of detection of an open failure of a contactor and fail-safe control upon high rotational speed and powering (an example in which the normal contactor is also in an open state).
Figure 16:
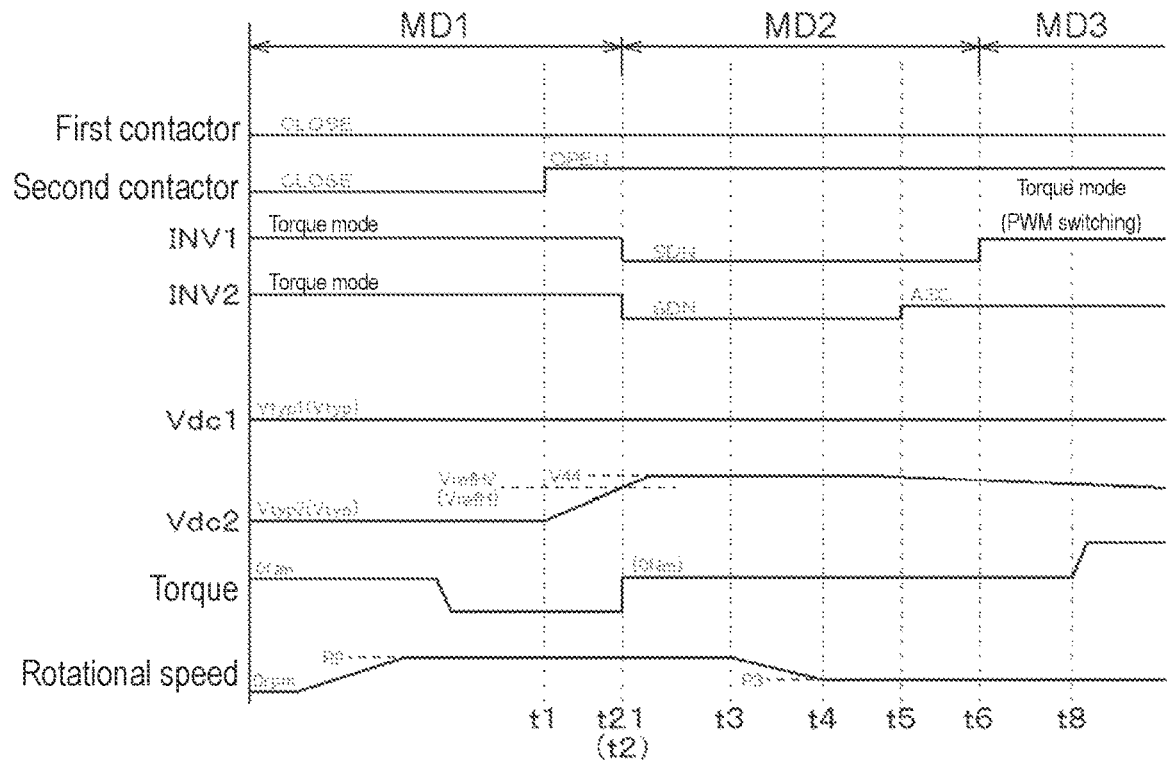
FIG. 16 is a timing chart showing an example of detection of an open failure of a contactor and fail-safe control upon intermediate rotational speed and regeneration (an example in which a normal contactor maintains a closed state).
Figure 17:
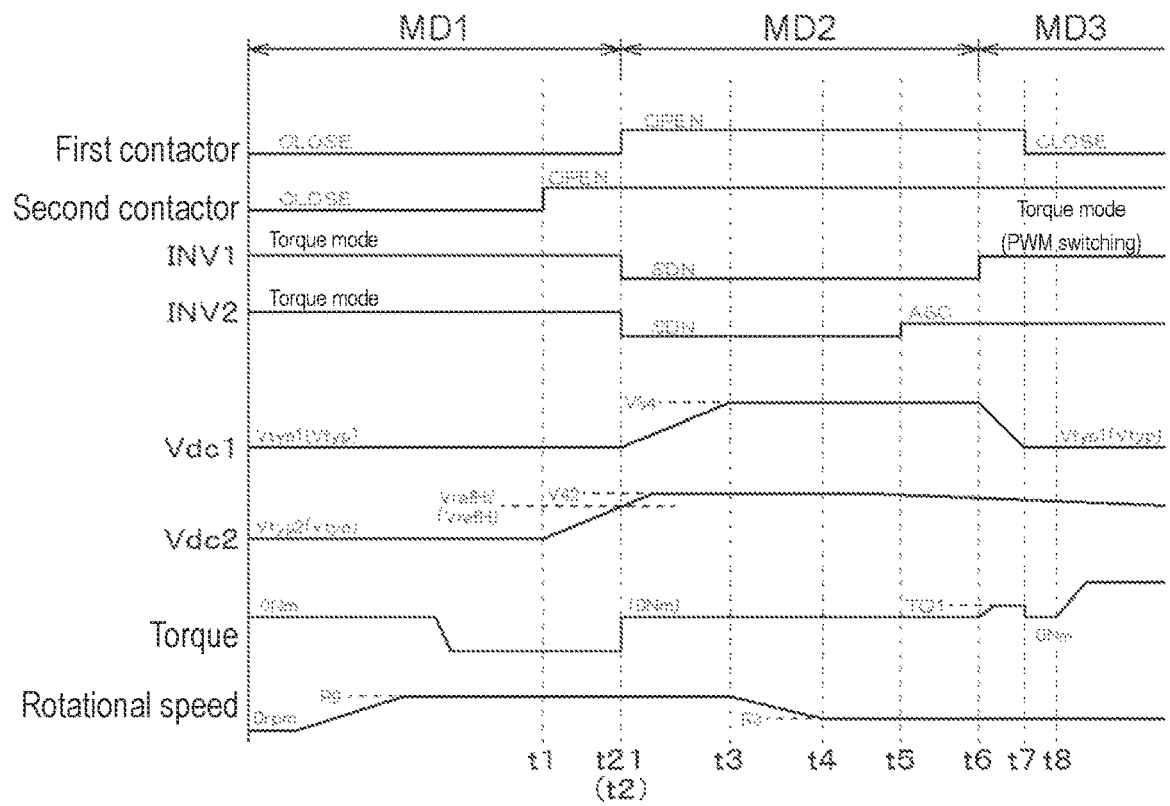
FIG. 17 is a timing chart showing an example of detection of an open failure of a contactor and fail-safe control upon intermediate rotational speed and regeneration (an example in which the normal contactor is also in an open state).
Figure 18:
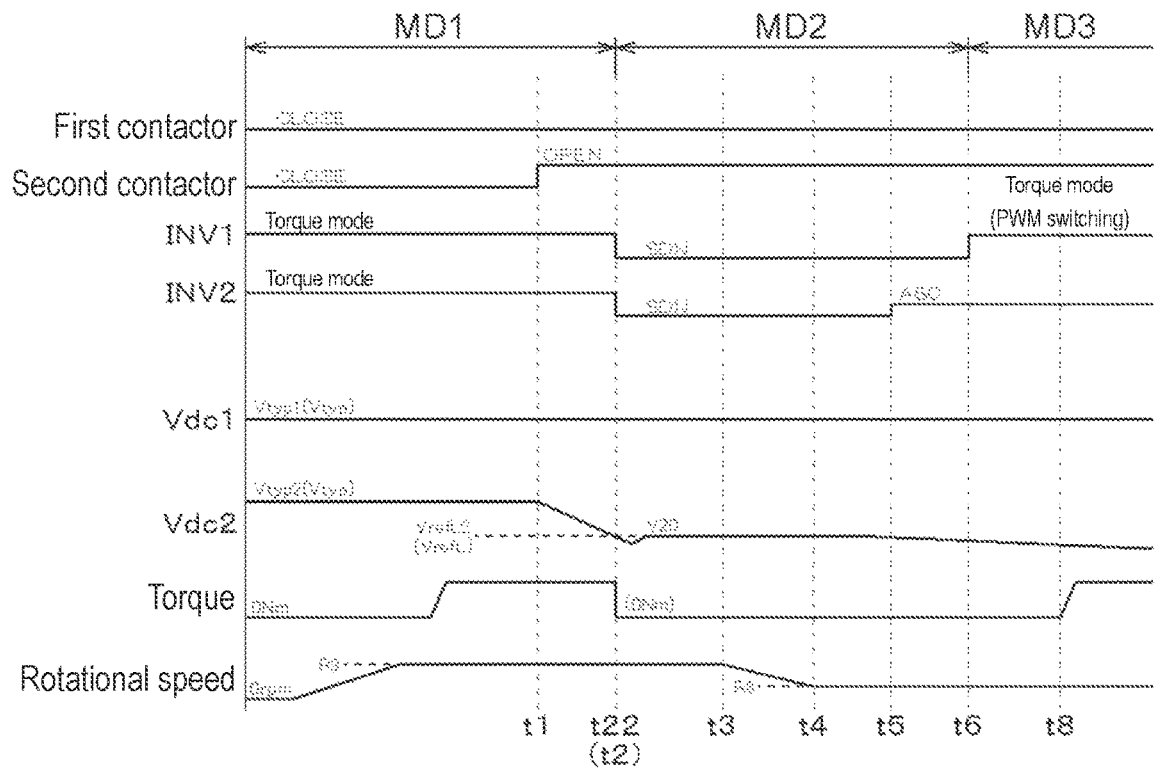
FIG. 18 is a timing chart showing an example of detection of an open failure of a contactor and fail-safe control upon intermediate rotational speed and powering (an example in which a normal contactor maintains a closed state).
Figure 19:
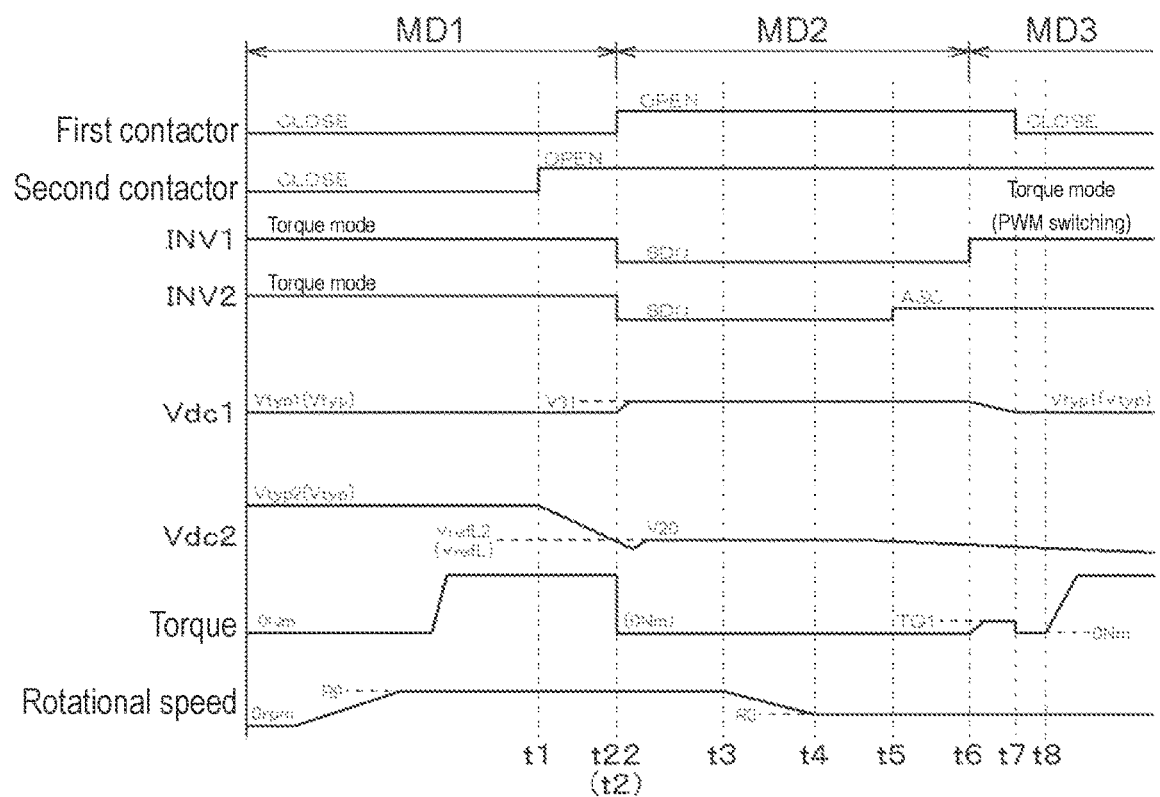
FIG. 19 is a timing chart showing an example of detection of an open failure of a contactor and fail-safe control upon intermediate rotational speed and powering (an example in which the normal contactor is also in an open state).

As shown in FIGS. 14 and 15, when the rotating electrical machine 80 is performing powering operation, too, the smoothing capacitors 4 are charged by back electromotive force, and thus, the same phenomenon is observed. Note that as is clear from a comparison of FIGS. 12 and 13 with FIGS. 16 and 17 and FIGS. 20 and 21, and a comparison of FIGS. 14 and 15, FIGS. 18 and 19, and FIGS. 22 and 23, the lower the rotational speed of the rotating electrical machine 80, the smaller the voltage rise in the second direct-current link voltage Vdc2.

Although the above description is made of a case in which the rotating electrical machine 80 performs regenerative operation, the same also applies to a case in which the rotating electrical machine 80 performs powering operation, and a person skilled in the art can easily understand by referring to FIGS. 14, 15, 18, 19, 22, and 23, and thus, a detailed description thereof is omitted. In addition, the determination at step #5 may be performed based on the operating region of the rotating electrical machine 80, or may be performed, as with step #7 which will be described later, by a comparison of the rotational speed of the rotating electrical machine 80 with a speed threshold value ωth.

At time t2, shutdown control is performed on both the first inverter 11 and the second inverter 12, by which the rotational speed of the rotating electrical machine 80 decreases by so-called braking torque. The timing charts of FIGS. 12 to 19 that exemplify cases in which the rotational speed of the rotating electrical machine 80 is the high rotational speed and the intermediate rotational speed (a rotational speed higher than or equal to the speed threshold value ωth exemplified at step #7 of FIG. 11) exemplify a mode in which the rotational speed starts to decrease from time t3. In the timing charts of FIGS. 20 to 23 in which the rotational speed of the rotating electrical machine 80 is the low rotational speed, upon the determination at step #5, too, the rotational speed is less than the speed threshold value ωth, and thus, even if the control mode goes into the shutdown control mode MD2, the rotational speed does not decrease.

For a process subsequent to step #5, first, control for the high-rotation region (a case of transitioning from step #5→step #6) will be described below. When the rotational speed of the rotating electrical machine 80 decreases and the rotational speed (represented by "w" in FIG. 11) reaches less than the speed threshold value ωth at time t4 (#7), thereafter, the rotating electrical machine control device 1 controls the second inverter 12 which is the failure-side inverter by active short-circuit control (#8a (#8)). Thereafter, the rotating electrical machine control device 1 controls the first inverter 11 which is the normal-side inverter by pulse width modulation control (#9 (#9a)).

As shown in FIG. 13, etc., at time t4, the rotational speed reaches R3 (here, the speed threshold value ωth>R3), and the second inverter 12 is controlled by active short-circuit control from time t5 later than time t4. Then, the rotating electrical machine control device 1 controls the first inverter 11 which is the normal-side inverter by pulse width modulation control from time t6 later than time t5.

Here, when the first contactor 91 which is the normal contactor is controlled to an open state, the first smoothing capacitor 41 is also charged and thus the first direct-current link voltage Vdc1 is higher than the first normal voltage Vtyp1 (FIGS. 13, 15, 17, 19, (21), and (23)). Hence, by providing a discharge torque instruction TQ1 to the first inverter 11 which is the normal-side inverter and driving the first inverter 11 by pulse width modulation control, the first smoothing capacitor 41 is discharged (#10). The discharge torque instruction TQ1 is less than or equal to 1% of maximum torque provided to the rotating electrical machine 80 and is, for example, very small torque of about 1 [Nm]. By driving the rotating electrical machine 80 so as to output very small torque, a smoothing capacitor 4 can be discharged without providing a large load to the rotating electrical machine 80.

By pulse width modulation control by the discharge torque instruction TQ1, the first smoothing capacitor 41 is discharged, and at time t7, the first direct-current link voltage Vdc1 decreases to the first normal voltage Vtyp1. The rotating electrical machine control device 1 brings the first contactor 91 which is the normal contactor back to a closed state, and brings the torque instruction to zero (#11). Namely, an instruction by the discharge torque instruction TQ1 is terminated. Then, at time t8 later than time t7, the rotating electrical machine control device 1 starts to provide a normal torque instruction to the first inverter 11, and drives the rotating electrical machine 80 by a torque control mode (single-inverter torque control mode MD3) (#12). Note that since pulse width modulation control based on the discharge torque instruction TQ1 is performed, the control mode from time t6 corresponds to the single-inverter torque control mode MD3.

Figure 20:
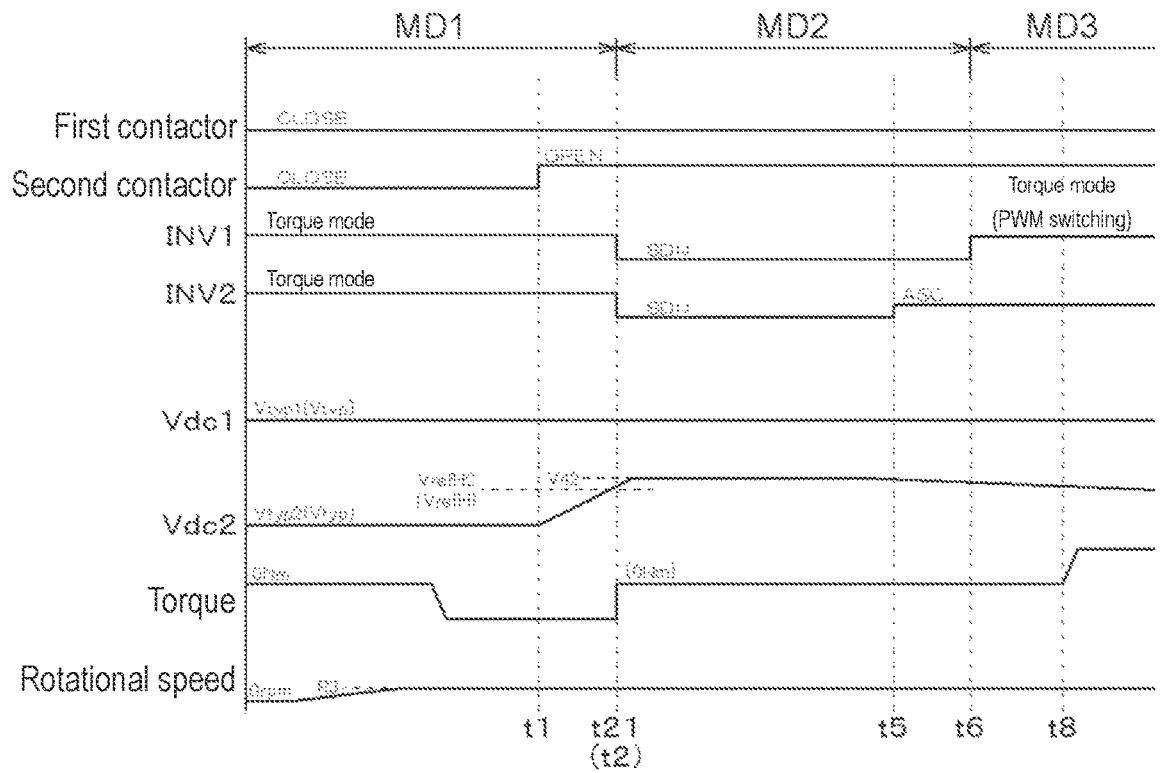
FIG. 20 is a timing chart showing an example of detection of an open failure of a contactor and fail-safe control upon low rotational speed and regeneration (an example in which a normal contactor maintains a closed state).
Figure 21:
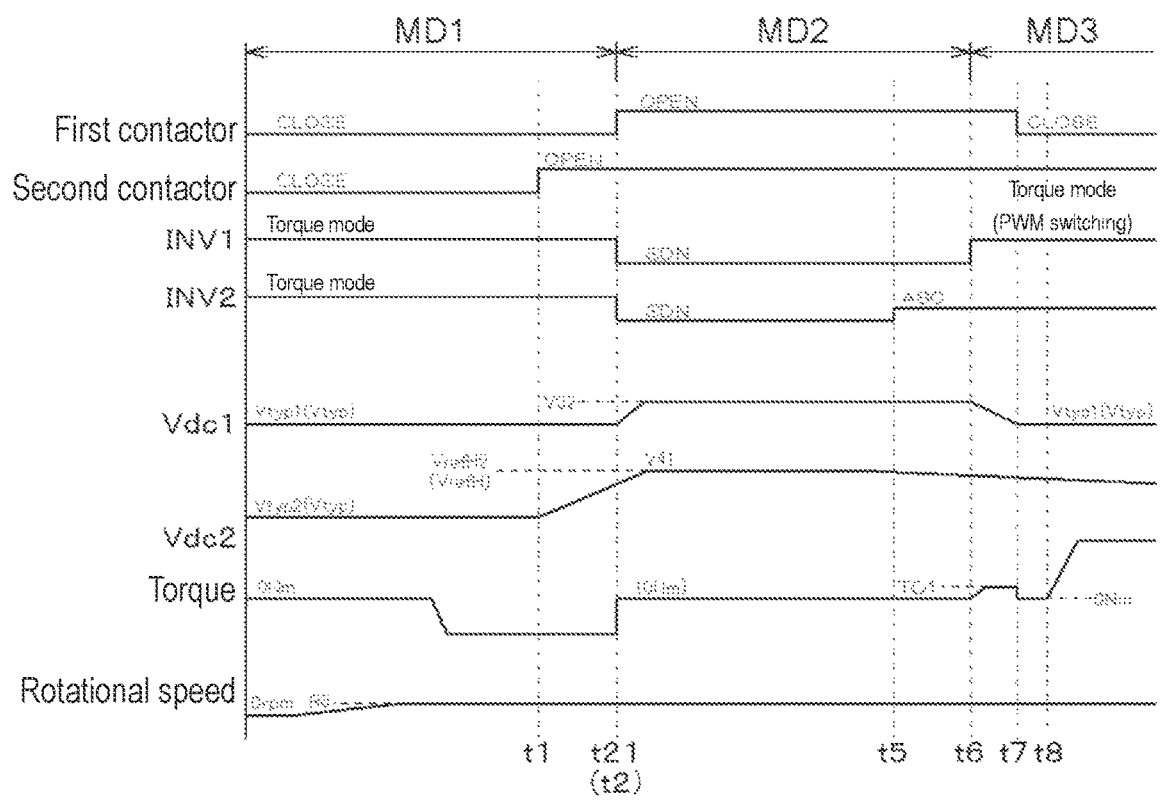
FIG. 21 is a timing chart showing an example of detection of an open failure of a contactor and fail-safe control upon low rotational speed and regeneration (an example in which the normal contactor is also in an open state).
Figure 22:
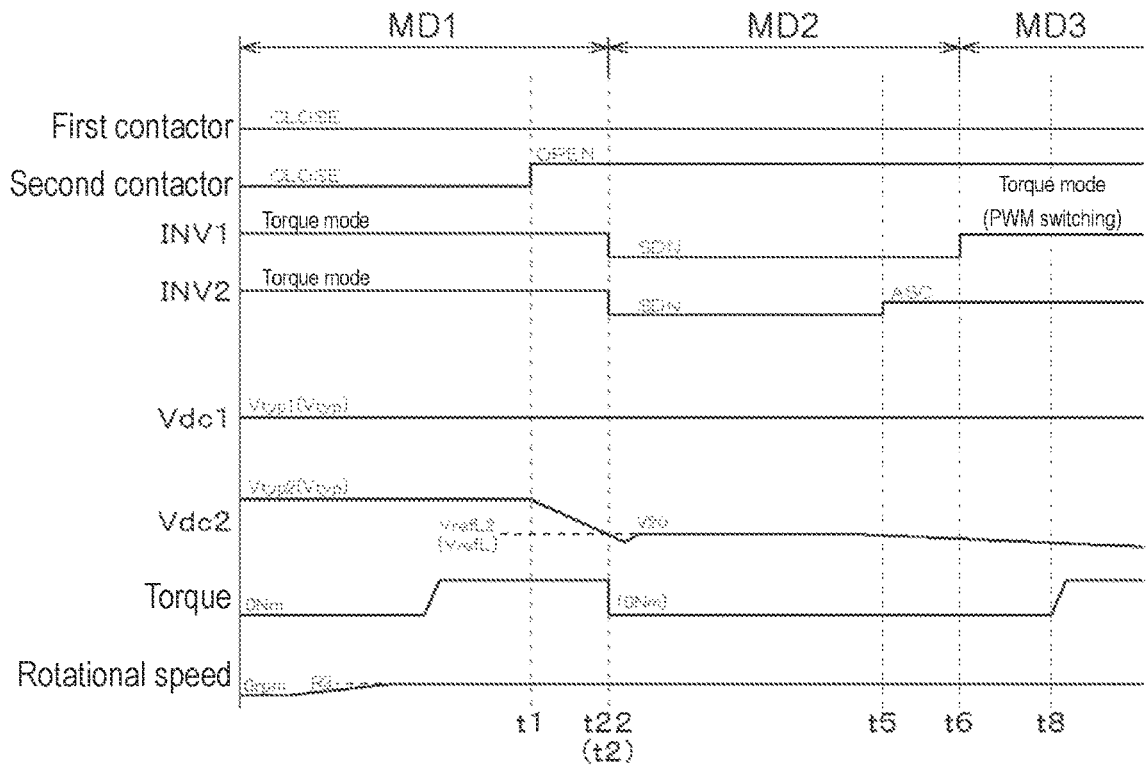
FIG. 22 is a timing chart showing an example of detection of an open failure of a contactor and fail-safe control upon low rotational speed and powering (an example in which a normal contactor maintains a closed state).
Figure 23:
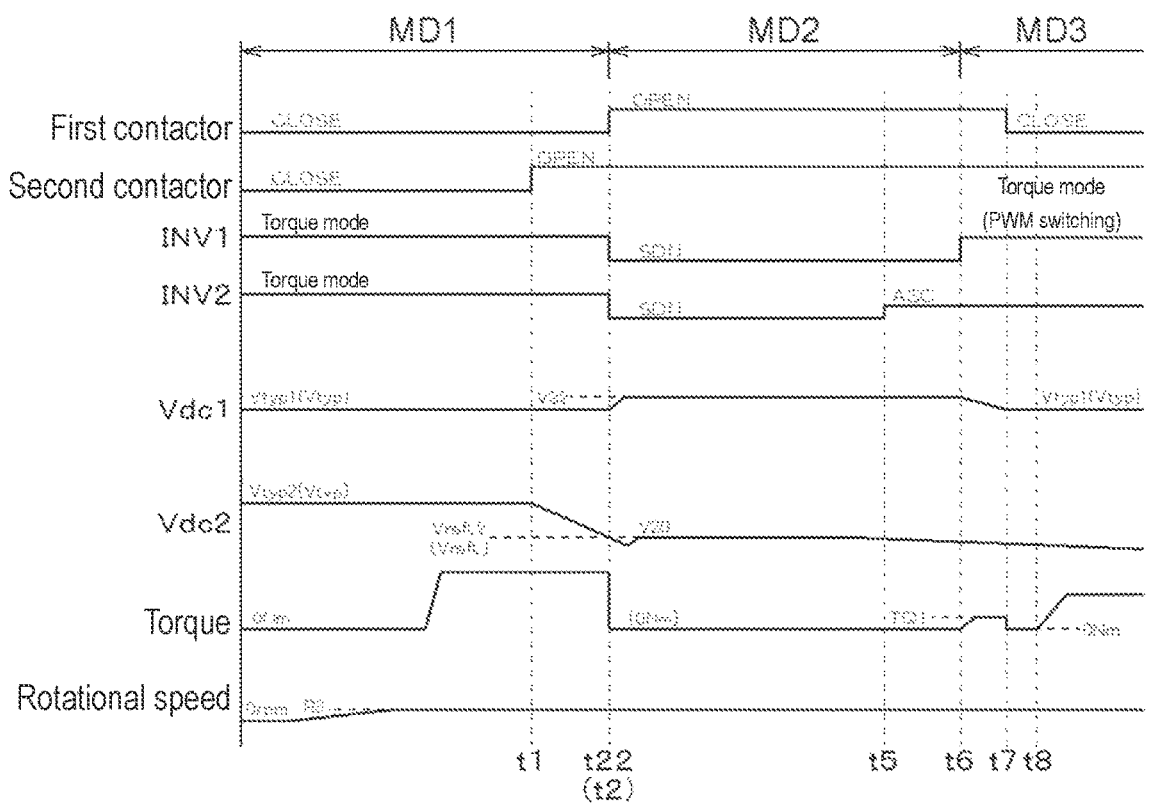
FIG. 23 is a timing chart showing an example of detection of an open failure of a contactor and fail-safe control upon wisdom rotational speed and powering (an example in which the normal contactor is also in an open state).

When the operating region of the rotating electrical machine 80 is not the high-rotation region, i.e., when step #5 transitions to step #8b, as shown in FIGS. 20 and 22, at time t5, the second inverter 12 is controlled by active short-circuit control (#8b). Furthermore, the rotating electrical machine control device 1 controls the first inverter 11 which is the normal-side inverter by pulse width modulation control from time t6 later than time t5 (#9 (#9b)).

Meanwhile, in the flowchart exemplified in FIG. 11, a mode is exemplified and described in which the normal contactor is controlled to an open state based on whether the operating region of the rotating electrical machine 80 is the high-rotation region or whether the rotational speed of the rotating electrical machine 80 is less than the speed threshold value ωth. However, as described above with reference to FIGS. 12 and 13, the reason that the normal contactor is brought into an open state is to suppress a rise in the voltage at both ends of a smoothing capacitor 4 connected to the failed contactor, i.e., the direct-current link voltage Vdc. Thus, when the rise in the direct-current link voltage Vdc does not exceed the withstanding voltages of the smoothing capacitor 4 and the inverter 10, even if the operating region is the high-rotation region, the normal contactor may be maintained in a closed state. That is, even if the operating region is the high-rotation region, the normal contactor may be maintained in a closed state as shown in FIGS. 12 and 14, instead of bringing the normal contactor into an open state as shown in FIGS. 13 and 15.

For example, in a case in which the rotating electrical machine control device 1 performs shutdown control with the rotational speed of the rotating electrical machine 80 being a preset maximum rotational speed and with one of the first contactor 91 and the second contactor 92 being in an open state and the other one being in a closed state, when a voltage at both ends of a smoothing capacitor 4 connected to a contactor 9 that is in an open state is less than or equal to the withstanding voltage of a corresponding inverter 10, even if the rotational speed of the rotating electrical machine 80 is greater than or equal to the defined speed threshold value ωth when it is determined that one of the first contactor 91 and the second contactor 92 is a failed contactor, a normal contactor which is the other one may be maintained in a closed state without bringing the normal contactor into an open state.

When the normal contactor is brought into an open state from a closed state, a voltage at both ends of a smoothing capacitor 4 connected to the normal contactor also rises, requiring control for reducing the risen voltage. Even if a voltage at both ends of a smoothing capacitor 4 connected to the failed contactor rises, if the voltage does not exceed the withstanding voltages of the smoothing capacitor 4 and an inverter 10 to which the smoothing capacitor 4 is connected, then there is a low necessity to distribute back electromotive force of the rotating electrical machine 80 to the two smoothing capacitors 4. Thus, fail-safe control can be performed by simple control.

As described above, when an open failure has occurred in either one of the contactors 9, the rotating electrical machine control device 1 can control drive of the rotating electrical machine 80 using only an inverter 10 to which the other contactor 9 having no failure is connected. However, since the rotating electrical machine 80 that is normally driven through the two inverters 10 is driven by one inverter 10, it is difficult to perform usual output. Thus, it is preferred that when the rotating electrical machine control device 1 determines that one of the first contactor 91 and the second contactor 92 is in an open state, the rotating electrical machine control device 1 limit torque and rotational speed that can be outputted from the rotating electrical machine 80 within a defined range. In addition, it is preferred that a driver of the vehicle be alerted of occurrence of a failure in the contactor 9.

By limiting the torque and rotational speed within the defined range, travel of the vehicle can be continued even under certain limitations. In addition, since the driver of the vehicle is alerted, the driver recognizes a failure in the vehicle based on the alert, and allows the vehicle to travel even under certain limitations and can allow the vehicle to travel to a safe location such as a road shoulder to stop the vehicle. Alternatively, the driver can allow the vehicle to travel to a service garage, a location where roadside assistance is received, etc., to have the vehicle fixed promptly. Namely, so-called limp home is possible.

As described above, according to the present embodiment, when a failure has occurred in one of the smoothing capacitors provided for the respective two inverters each provided at each end side of the open-end windings, the failed smoothing capacitor can be identified.

SUMMARY OF THE EMBODIMENT

A summary of the rotating electrical machine control system (100) described above will be briefly described below.

In one aspect, a rotating electrical machine control system (100) that controls drive of a rotating electrical machine (80) having open-end windings (8) of a plurality of phases that are independent of each other includes a first inverter (11) connected to a one-end side of the open-end windings (8); a second inverter (12) connected to an other-end side of the open-end windings (8); a first direct-current power supply (61) to which the first inverter (11) is connected; a second direct-current power supply (62) to which the second inverter (12) is connected; a first smoothing capacitor (41) connected in parallel to the first direct-current power supply (61); a second smoothing capacitor (42) connected in parallel to the second direct-current power supply (62); a first contactor (91) that establishes and cuts off an electrical connection between the first inverter (11) and the first smoothing capacitor (41), and the first direct-current power supply (61); a second contactor (92) that establishes and cuts off an electrical connection between the second inverter (12) and the second smoothing capacitor (42), and the second direct-current power supply (62); and a control part (1) that controls each of the first contactor (91) and the second contactor (92) and can control the first inverter (11) and the second inverter (12) independently of each other, and in the first inverter (11) and the second inverter (12), an arm (3A) for one alternating-current phase includes a series circuit of an upper-stage-side switching element (3H) and a lower-stage-side switching element (3L), the control part (1) can control each of the first inverter (11) and the second inverter (12) by active short-circuit control that brings all of the upper-stage-side switching elements (3H) into off state and brings all of the lower-stage-side switching elements (3L) into on state, or brings all of the upper-stage-side switching elements (3H) into on state and brings all of the lower-stage-side switching elements (3L) into off state, and by shutdown control that brings all switching elements (3) of a plurality of phases into off state, and using a first upper limit voltage (VrefH1) set to a value larger than a voltage fluctuation range of the first direct-current power supply (61), a first lower limit voltage (VrefL1) set to a value smaller than a voltage fluctuation range of the first direct-current power supply (61), a second upper limit voltage (VrefH2) set to a value larger than a voltage fluctuation range of the second direct-current power supply (62), and a second lower limit voltage (VrefL2) set to a value smaller than a voltage fluctuation range of the second direct-current power supply (62), the control part (1) determines that the first contactor (91) is in an open state, when a voltage (Vdc1) at both ends of the first smoothing capacitor (41) is higher than the first upper limit voltage (VrefH1) or lower than the first lower limit voltage (VrefL1), and a current (Ib1) flowing through the first direct-current power supply (61) is less than or equal to a first lower limit current (Iref1) defined in advance; determines that the second contactor (92) is in an open state, when a voltage (Vdc2) at both ends of the second smoothing capacitor (42) is higher than the second upper limit voltage (VrefH2) or lower than the second lower limit voltage (VrefL2), and a current (Ib2) flowing through the second direct-current power supply (62) is less than or equal to a second lower limit current (Iref2) defined in advance; considers one of contactors (9) that is determined to be in an open state a failed contactor and considers the other one of the contactors (9) a normal contactor, the contactors (9) being the first contactor (91) and the second contactor (92); controls both the first inverter (11) and the second inverter (12) by shutdown control and brings both the first contactor (91) and the second contactor (92) into an open state, in a state in which a rotational speed of the rotating electrical machine (80) is greater than or equal to a speed threshold value (ωth) defined in advance; after the rotational speed of the rotating electrical machine (80) reaches less than the speed threshold value (ωth), controls a failure-side inverter by the active short-circuit control and maintains the normal contactor in an open state, and drives a normal-side inverter using discharge torque of a normal-side smoothing capacitor, the failure-side inverter being an inverter (10) connected to the failed contactor, the normal-side inverter being an inverter (10) connected to the normal contactor, and the normal-side smoothing capacitor being a smoothing capacitor (4) connected to the normal-side inverter; and after a rise in a voltage (Vdc) at both ends of the normal-side smoothing capacitor is eliminated, controls the normal contactor to a closed state and controls drive of the rotating electrical machine (80) by the normal-side inverter.

According to this configuration, when the rotating electrical machine (80) is performing regenerative operation, occurrence of a failure in a contactor (9) can be detected by a current (Ib) of a direct-current power supply that stops flowing due to the contactor (9) going into an open state and by a voltage (Vdc) at both ends of a smoothing capacitor (4) that rises by a regenerative current. In addition, when the rotating electrical machine (80) is performing powering operation, occurrence of a failure in a contactor (9) can be detected by a current (Ib) of a direct-current power supply that stops flowing due to the contactor (9) going into an open state and by a voltage (Vdc) at both ends of a smoothing capacitor (4) that drops due to being discharged to drive the rotating electrical machine (80). Furthermore, according to the configuration, after both inverters (10) are controlled by shutdown control, one of the inverters (10) to which a failed contactor (9) is connected is short-circuited by active short-circuit control, and the rotating electrical machine (80) is driven by the other inverter (10). At this time, when the rotational speed of the rotating electrical machine (80) is greater than or equal to the speed threshold value (ωth), a contactor (9) having no failure is also controlled to an open state. By this, back electromotive force from the rotating electrical machine (80) is absorbed by the two smoothing capacitors (4), enabling suppression of a rise in a voltage (VDc) at both ends of a smoothing capacitor (4) connected to the failed contactor. In this case, a voltage (Vdc) at both ends of a normal-side smoothing capacitor connected to a normal-side inverter also rises, but the normal-side smoothing capacitor is discharged by driving the normal-side inverter using discharge torque (TQ1). When the rise in the voltage (Vdc) at both ends of the normal-side smoothing capacitor is eliminated, drive of the rotating electrical machine (80) is controlled by the normal-side inverter. As such, according to the configuration, when a failure has occurred in one of the contactors (9) each provided between one of the direct-current power supplies (6) connected to the respective two inverters (10) each provided at each end side of the open-end windings (8), the failed contactor (9) is identified and drive of the rotating electrical machine (80) can be controlled.

In addition, it is preferred that in a case in which the control part (1) performs the shutdown control with a rotational speed of the rotating electrical machine (80) being a maximum rotational speed set in advance and with one of the first contactor (91) and the second contactor (92) being in an open state and the other one being in a closed state, when a voltage (Vdc) at both ends of a smoothing capacitor (4) connected to one of the contactors (9) that is in an open state is less than or equal to a withstanding voltage of a corresponding one of the inverters (10), even if a rotational speed of the rotating electrical machine (80) is greater than or equal to a defined speed threshold value (ωth) when it is determined that one of the first contactor (91) and the second contactor (92) is the failed contactor, the control part (1) maintain the normal contactor which is the other one in a closed state without bringing the normal contactor into an open state.

When a normal contactor is brought into an open state from a closed state, a voltage (Vdc) at both ends of a smoothing capacitor (4) connected to the normal contactor also rises, requiring control for reducing the risen voltage. Even if a voltage (Vdc) at both ends of a smoothing capacitor (4) connected to a failed contactor rises, if the voltage (Vdc) does not exceed the withstanding voltages of the smoothing capacitor (4) and an inverter (10) to which the smoothing capacitor (4) is connected, then there is a low necessity to distribute back electromotive force of the rotating electrical machine (80) to the two smoothing capacitors (4). Thus, fail-safe control can be performed by simple control.

In addition, it is preferred that the rotating electrical machine (80) be a drive power source that is mounted on a vehicle to drive wheels of the vehicle, and when the control part (1) determines that one of the first contactor (91) and the second contactor (92) is in an open state, the control part (1) limit torque and rotational speed that can be outputted from the rotating electrical machine (80) within a defined range, and alert a driver of the vehicle.

By limiting the torque and rotational speed within the defined range, travel of the vehicle can be continued even under certain limitations. In addition, since the driver of the vehicle is alerted, the driver recognizes a failure in the vehicle based on the alert, and allows the vehicle to travel even under certain limitations and can allow the vehicle to travel to a safe location such as a road shoulder to stop the vehicle. Alternatively, the driver can allow the vehicle to travel to a service garage, a location where roadside assistance is received, etc., to have the vehicle fixed promptly. Namely, so-called limp home is possible.

In addition, it is preferred that the discharge torque (TQ1) be less than or equal to 1% of maximum torque.

By driving a normal-side inverter (10) by, for example, pulse width modulation control so that the normal-side inverter (10) outputs discharge torque (TQ1), a smoothing capacitor (4) connected to the normal-side inverter is discharged. When the discharge torque (TQ1) is less than or equal to 1% of maximum torque of the rotating electrical machine (80), it is very small torque. By driving the rotating electrical machine (80) so as to output such very small torque, the smoothing capacitor (4) can be discharged without providing a large load to the rotating electrical machine (80).

REFERENCE SIGNS LIST

1: Rotating electrical machine control device (control part), 3: Switching element, 3A: Arm, 3H: Upper-stage-side switching element, 3L: Lower-stage-side switching element, 4: Smoothing capacitor, 6: Direct-current power supply, 8: Stator coil (open-end winding), 9: Contactor, 10: Inverter, 11: First inverter, 12: Second inverter, 41: First smoothing capacitor, 42: Second smoothing capacitor, 61: First direct-current power supply, 62: Second direct-current power supply, 80: Rotating electrical machine, 91: First contactor, 92: Second contactor, 100: Rotating electrical machine control system, Ib: Battery current, Ib1: First battery current (current flowing through the first direct-current power supply), Ib2: Second battery current (current flowing through the second direct-current power supply), Iref1: First lower limit current, Iref2: Second lower limit current, TQ1: Discharge torque instruction, VrefH1: First upper limit voltage, VrefH2: Second upper limit voltage, VrefL1: First lower limit voltage, VrefL2: Second lower limit voltage, and ωth: Speed threshold value

The invention claimed is:
1. A rotating electrical machine control system that controls drive of a rotating electrical machine having open-end windings of a plurality of phases that are independent of each other, the rotating electrical machine control system comprising:
 a first inverter connected to a one-end side of the open-end windings;
 a second inverter connected to an other-end side of the open-end windings;
 a first direct-current power supply to which the first inverter is connected;
 a second direct-current power supply to which the second inverter is connected;
 a first smoothing capacitor connected in parallel to the first direct-current power supply;
 a second smoothing capacitor connected in parallel to the second direct-current power supply;
 a first contactor that establishes and cuts off an electrical connection between the first inverter and the first smoothing capacitor, and the first direct-current power supply;
 a second contactor that establishes and cuts off an electrical connection between the second inverter and the second smoothing capacitor, and the second direct-current power supply; and
 a control part that controls each of the first contactor and the second contactor and can control the first inverter and the second inverter independently of each other, wherein
in the first inverter and the second inverter, an arm for one alternating-current phase includes a series circuit of an upper-stage-side switching element and a lower-stage-side switching element,
the control part can control each of the first inverter and the second inverter by active short-circuit control that brings all of the upper-stage-side switching elements into off state and brings all of the lower-stage-side switching elements into on state, or brings all of the upper-stage-side switching elements into on state and brings all of the lower-stage-side switching elements into off state, and by shutdown control that brings all switching elements of a plurality of phases into off state, and
using a first upper limit voltage set to a value larger than a voltage fluctuation range of the first direct-current power supply, a first lower limit voltage set to a value smaller than a voltage fluctuation range of the first direct-current power supply, a second upper limit voltage set to a value larger than a voltage fluctuation range of the second direct-current power supply, and a second lower limit voltage set to a value smaller than a voltage fluctuation range of the second direct-current power supply,
the control part
determines that the first contactor is in an open state, when a voltage at both ends of the first smoothing capacitor is higher than the first upper limit voltage or lower than the first lower limit voltage, and a current flowing through the first direct-current power supply is less than or equal to a first lower limit current defined in advance;
determines that the second contactor is in an open state, when a voltage at both ends of the second smoothing capacitor is higher than the second upper limit voltage or lower than the second lower limit voltage, and a current flowing through the second direct-current power supply is less than or equal to a second lower limit current defined in advance;
considers one of contactors that is determined to be in an open state a failed contactor and considers an other one of the contactors a normal contactor, the contactors being the first contactor and the second contactor;
controls both the first inverter and the second inverter by shutdown control and brings both the first contactor and the second contactor into an open state, in a state in which a rotational speed of the rotating electrical machine is greater than or equal to a speed threshold value defined in advance;
after a rotational speed of the rotating electrical machine reaches less than the speed threshold value, controls a failure-side inverter by the active short-circuit control and maintains the normal contactor in an open state, and drives a normal-side inverter using discharge torque of a normal-side smoothing capacitor, the failure-side inverter being an inverter connected to the failed contactor, the normal-side inverter being an inverter connected to the normal contactor, and the normal-side smoothing capacitor being a smoothing capacitor connected to the normal-side inverter; and
after a rise in a voltage at both ends of the normal-side smoothing capacitor is eliminated, controls the normal contactor to a closed state and controls drive of the rotating electrical machine by the normal-side inverter.

2. The rotating electrical machine control system according to claim 1, wherein in a case in which the control part performs the shutdown control with a rotational speed of the rotating electrical machine being a maximum rotational speed set in advance and with one of the first contactor and the second contactor being in an open state and an other one being in a closed state, when a voltage at both ends of a smoothing capacitor connected to one of the contactors that is in an open state is less than or equal to a withstanding voltage of a corresponding one of the inverters, even if a rotational speed of the rotating electrical machine is greater than or equal to a defined speed threshold value when it is determined that one of the first contactor and the second contactor is the failed contactor, the control part maintains the normal contactor that is an other one in a closed state without bringing the normal contactor into an open state.

3. The rotating electrical machine control system according to claim 2, wherein
the rotating electrical machine is a drive power source that is mounted on a vehicle to drive wheels of the vehicle, and
when the control part determines that one of the first contactor and the second contactor is in an open state, the control part limits torque and rotational speed that can be outputted from the rotating electrical machine within a defined range, and alerts a driver of the vehicle.

4. The rotating electrical machine control system according to claim 3, wherein the discharge torque is less than or equal to 1% of maximum torque.

5. The rotating electrical machine control system according to claim 2, wherein the discharge torque is less than or equal to 1% of maximum torque.

6. The rotating electrical machine control system according to claim 1, wherein
the rotating electrical machine is a drive power source that is mounted on a vehicle to drive wheels of the vehicle, and
when the control part determines that one of the first contactor and the second contactor is in an open state, the control part limits torque and rotational speed that can be outputted from the rotating electrical machine within a defined range, and alerts a driver of the vehicle.

7. The rotating electrical machine control system according to claim 6, wherein the discharge torque is less than or equal to 1% of maximum torque.

8. The rotating electrical machine control system according to claim 1, wherein the discharge torque is less than or equal to 1% of maximum torque.

* * * * *